(12) United States Patent
Spofford

(10) Patent No.: US 11,638,868 B2
(45) Date of Patent: May 2, 2023

(54) CONTROLLER HAVING DISPLAY WITH SELECTABLE ICONS

(71) Applicant: Valve Corporation, Bellevue, WA (US)

(72) Inventor: Tucker Jensen Spofford, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 19 days.

(21) Appl. No.: 17/174,232

(22) Filed: Feb. 11, 2021

(65) Prior Publication Data

US 2021/0252387 A1    Aug. 19, 2021

Related U.S. Application Data

(60) Provisional application No. 62/977,049, filed on Feb. 14, 2020.

(51) Int. Cl.
| | |
|---|---|
| *A63F 13/2145* | (2014.01) |
| *A63F 13/218* | (2014.01) |
| *G06F 3/04842* | (2022.01) |
| *A63F 13/98* | (2014.01) |
| *G06F 3/04883* | (2022.01) |
| *A63F 13/24* | (2014.01) |
| *A63F 13/25* | (2014.01) |

(52) U.S. Cl.
CPC ........ *A63F 13/2145* (2014.09); *A63F 13/218* (2014.09); *A63F 13/24* (2014.09); *A63F 13/25* (2014.09); *A63F 13/98* (2014.09); *G06F 3/04842* (2013.01); *G06F 3/04883* (2013.01)

(58) Field of Classification Search
CPC .... A63F 13/2145; A63F 13/218; A63F 13/24; A63F 13/25; A63F 13/98; G06F 3/04842; G06F 3/04883
See application file for complete search history.

(56) References Cited

U.S. PATENT DOCUMENTS

| | | |
|---|---|---|
| 6,570,078 B2 | 5/2003 | Ludwig |
| 8,754,746 B2 | 6/2014 | Lukas et al. |

(Continued)

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

(Continued)

*Primary Examiner* — Yingchuan Zhang
(74) *Attorney, Agent, or Firm* — Lee & Hayes, P.C.

(57) ABSTRACT

A controller system for surfacing selectable elements on a display of the controller along with game content associated with a video game is described. In an example, a user may provide touch input on the display, and, in response, a game content window that is presenting the game content may scale and/or move to a new position on the display in order to create space on the display for presenting one or more selectable elements outside of the scaled and/or repositioned game content window. The surfaced element(s) may be selectable to cause performance of a game-related action. In this manner, the selectable element(s) do(es) not occlude the game content, and the user may interact with both the game content and the selectable element(s) presented on the display.

20 Claims, 10 Drawing Sheets

(56) References Cited

U.S. PATENT DOCUMENTS

| | | |
|---|---|---|
| 9,950,256 B2 | 4/2018 | Lim |
| 10,162,494 B2 * | 12/2018 | Kang .................. G06F 3/04842 |
| 10,427,035 B2 | 10/2019 | Schmitz et al. |
| 10,441,881 B2 | 10/2019 | Burgess et al. |
| 2006/0111180 A1 | 5/2006 | Cheng |
| 2008/0165140 A1 | 7/2008 | Christie et al. |
| 2008/0261695 A1 | 10/2008 | Coe |
| 2009/0205878 A1 | 8/2009 | Taylor |
| 2015/0067495 A1 | 3/2015 | Bernstein et al. |
| 2015/0105152 A1 * | 4/2015 | Bellinghausen .... A63F 13/2145 463/31 |
| 2017/0189800 A1 | 7/2017 | Crain |
| 2017/0197144 A1 | 7/2017 | Maa |
| 2019/0188959 A1 | 6/2019 | Lutnick et al. |

OTHER PUBLICATIONS

WICO Corporation Consumer Division Manual for "WICO Command Control" Trackball controller, 1982, 6 pages.
PCT Search Report and Written Opinion dated May 3, 2021 for PCT Application No. PCT/US21/17959, 9 pages.

* cited by examiner

CONTROLLER HAVING DISPLAY WITH SELECTABLE ICONS

CROSS REFERENCE TO RELATED APPLICATION

This application claims priority to co-pending and commonly assigned U.S. Provisional Patent Application Ser. No. 62/977,049, entitled "CONTROLLER HAVING DISPLAY WITH SELECTABLE ICONS," and filed on Feb. 14, 2020, the entirety of which is incorporated herein by reference.

BACKGROUND

Handheld controllers are used in an array of architectures for providing input, for example, to a local or remote computing device. For instance, handheld controllers are utilized in the gaming industry to allow players to interact with a personal computing device executing a gaming application, a game console, a game server, the handheld controller itself, or the like. While current handheld controllers provide a range of functionality, further technical improvements may enhance user experiences that these controllers offer.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

DETAILED DESCRIPTION

Figure 1:
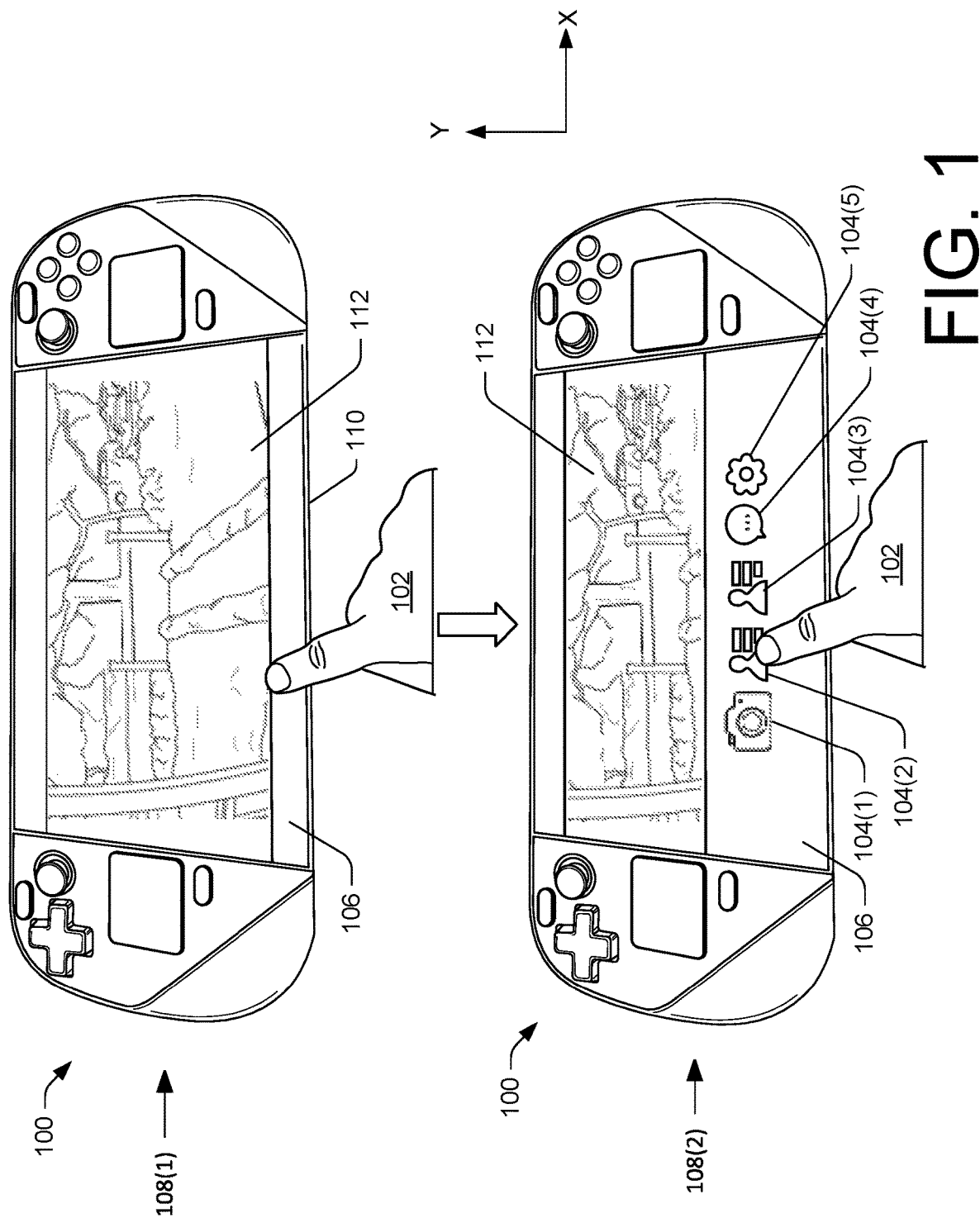
FIG. 1 illustrates a front view of an example handheld controller having a touch sensitive display and a user interacting with the handheld controller to surface one or more selectable elements.

As mentioned above, handheld controllers are used in a range of environments and include a range of functionality. Some traditional handheld controllers include limited controls operable by a user. Traditional handheld controller may also offer little customization.

Described herein are, among other things, handheld controllers having various controls to engage in video game play via an executing video game application, and/or to control other types of applications and/or programs. In some instances, the handheld controller may include controls for controlling a game or application running on the handheld controller itself (e.g., a standalone, handheld gaming system that is substantially self-contained on the controller). In some instances, the handheld controller may include controls for controlling a remote device (e.g., a television, audio system, personal computing device, game console, etc.).

The handheld controller may include one or more controls, including one or more front-surface controls on a front surface of a housing of the handheld controller. These front-surface controls may include one or more joysticks, directional pads (D-pads), trackpads, trackballs, buttons, or other controls that are controllable, for instance, by a thumb of a user operating the handheld controller. In some implementations, the handheld controller may include one or more top-surface controls residing on a top surface of the housing of the handheld controller. These top-surface controls may be referred to as "triggers," "bumpers," or the like, and may be controllable by one or more fingers of the user, such as a middle finger, an index finger, or the like. In some instances, the handheld controller includes one or more top-surface controls that are operable by one or more fingers of a left hand and/or one or more fingers of a right hand of the user. In addition, the handheld controller may include one or more back-surface controls. In some instances, the back-surface controls may include one or more controls operable by a left hand of a user and/or a right hand of the user. The front of the handheld controller may also include a display which presents content.

The handheld controllers described herein may provide convenient access for adjusting setting(s) or performing commands or actions associated with an application being controlled or operated by the handheld controller, such as a video game application. In such instances, the handheld controller may provide increased functionalities or offer the user the ability to define, customize, augment, and/or enhance their gameplay experiences. For example, the display may be configured to present various user interfaces (UIs) or menus that include icons or elements that are selectable by the user. The user may select certain icons for performing actions that relate to the video game. These actions may be performed at least in part by the handheld controller and/or a host PC, server, and/or computing device(s) communicatively coupled to the handheld controller.

In an illustrative example, during execution of a video game, a controller system that includes the handheld controller may cause game content associated with the video game to be presented within a game content window on the display of the controller. The game content window may span the entire display screen (e.g., in a full screen mode) or a portion, but not all, of the display screen. In general, the user may interact with the game content within the game content window by operating the controls (e.g., front-surface controls, top-surface controls, back-surface controls, etc.) of the controller. For example, a user may operate one or more of the front-surface controls to (e.g., a joystick, D-pad, trackpad, etc.) to control movement of a virtual character, fire a virtual weapon, etc.

The display of the controller may be touch sensitive, and the user may provide touch input on the display in order to surface one or more selectable elements (e.g., icons) that are selectable to perform game-related actions. For example, the user may touch or tap anywhere on the touch sensitive display, or the user may perform a specific gesture on the display, such as a swipe gesture, to surface the selectable element(s) on the display. When the selectable element(s) is/are presented on the display in response to the user providing the touch input, the game content window may be repositioned and/or scaled in size in order to make room for the selectable element(s) appearing on the display. In this manner, the selectable element(s) may be presented outside of (e.g., below, above, beside, etc.) the repositioned and/or scaled game content window. In an illustrative example, if a user performs a swipe gesture at the bottom edge of the display in the upward direction, the game content window may be shifted up from a current position to a new position on the display, and the selectable element(s) may be presented below the repositioned game content window. In this manner, the game content is not occluded by the selectable element(s) that appear(s) on the display responsive to the touch input. This repositioning of the game content window may be enabled by an aspect ratio associated with the game content being smaller than the aspect ratio of the display. For example, game content with a 16:9 aspect ratio may be rendered on a display that has an aspect ratio of 16:10. In this manner, the game content window presenting the game content may be scaled-down and rendered on a portion, but not all, of the display, at least in some instances. Furthermore, the game content window may be scaled or resized dynamically, as described herein. The game content window may also be dynamically repositioned on the display in order to create room on the display for the presentation of augmentative content, such as the selectable element(s) described herein. When the user selects one of the selectable elements, various actions may be performed, such as actions that allow the user to adjust a setting of the controller, capture a still image of the game content, and/or start a chat session with a friend/player who is playing the same video game, but using a different controller. In this way, the gameplay experience of the user may be enhanced without sacrificing the quality of the gameplay experience (e.g., without occluding game content with augmentative content).

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front view of an example controller 100 and a user 102 interacting with the handheld controller 100 to surface one or more selectable elements 104. The controller 100 may be considered to be hand-held if it is operated by the hands of a user 102, whether or not the entire controller 100 is supported by or within the hands of the user 102. However, in accordance with various embodiments described herein, the terms "device," "handheld device," "handheld game device," "handheld console," "handheld game console," "controller," and "handheld controller" may be used interchangeably herein to describe any device like the controller 100.

The controller 100 may include a display 106 that is touch sensitive. The display 106 may represent any suitable type of display, such as a liquid crystal display (LCD), an organic light emitting diode (OLED) display, an inorganic light emitting diode (ILED) display, or the like. The touch sensing technology of the display 106 may be any suitable type of touch sensing technology, such as capacitive, resistive, infrared, surface acoustic wave (SAW), or the like. In general, logic (hardware, software, and/or firmware) of a controller system that includes the controller 100 may be configured to process data indicative of touch input provided on the display 106 to determine a presence or contact of an object (e.g., a finger) or multiple objects (e.g., fingers) near and/or on the display 106, a location of the object's presence and/or contact, a gesture made by the object (e.g., swipe gesture, pinch gesture, splay gesture, double tap gesture, touch-and-hold gesture, etc.).

FIG. 1 illustrates the user 102 interfacing or interacting with the display 106 in order to surface one or more selectable elements 104 (e.g., icons) on the display 106. For example, at a first time or instance 108(1), a game content window 112 may be presented on the display 106. Game content may be displayed within the game content window 112. FIG. 1 illustrates a virtual environment or game world that is being displayed within the game content window 112. In general, the user 102 may operate the controls of the controller 100 to control an aspect of the video game, such as to move a player-controlled character about the video game world displayed within the game content window 112. For example, a D-pad, joystick, and/or trackpad of the controller 100 may be used to move a player-controlled character in the video game, and the game content within the game content window may change (e.g., pan across the screen) as a result of the user 102 operating the controls of the controller 100.

Furthermore, as depicted in FIG. 1, the user 102 may touch the display 106 and/or perform a specific gesture (e.g., swipe upward at a bottom edge 110 of the display 106), and a processor(s) of the controller system disclosed herein may receive an indication of this touch input (e.g., an indication that a finger of the user 102 swiped from the bottom edge 110 towards a center of the display 106). In response to receiving this indication, the processor(s) may cause the game content window 112 to move from a current position on the display 106 at time 108(1) to a new position on the display 106 at time 108(2). For example, FIG. 1 illustrates the game content window 112 shifting upwards between time 108(1) and time 108(2) in response to touch input provided on the display 106 at time 108(1). This repositioning of the game content window 112 may be enabled by an aspect ratio associated with the game content being smaller than the aspect ratio of the display 106. For example, the game content may be associated with a 16:9 aspect ratio, while the display 106 may have an aspect ratio of 16:10. In this manner, the game content window 112 can be scaled-down and rendered on a portion, but not all, of the display 106, thereby allowing the window 112 to be repositioned on the display 106. Additionally, or alternatively, the game content window 112 may be scalable in size. Accordingly, the window 112 might scale to a smaller size game content window between time 108(1) and time 108(2) in response to the touch input provided on the display 106 at time 108(1).

FIG. 1 illustrates an example where the game content window 112 is initially presented in a center portion of the display 106 at time 108(1) in the sense that a center of the game content window 112 is concentric or otherwise coincident with a center of the display 106. Furthermore, in the example of FIG. 1, the game content window 112 is displayed on a portion, but not all, of the display 106 at time 108(1). Accordingly, there may be blank space above and below the game content window 112 on the display 106, in some embodiments. It is to be appreciated, however, that a full-screen game content window 112 may be displayed at time 108(1) such that the window 112 spans the entire area of the display 106. Furthermore, the game content window 112 does not have to be presented in the center of the display 106 at time 108(1). Instead, the window 112 may be displayed initially at the top, the bottom, the left, or the right of the display 106.

By repositioning and/or scaling-down the game content window 112 at time 108(2), extra space is created on the display for the presentation of augmentative content, such as the selectable elements 104(1)-(5) shown in FIG. 1. In this example, the selectable elements 104(1)-(5) are presented below the repositioned and/or scaled game content window 112 on the display 106. For example, the selectable elements 104(1)-(5) may be presented in a menu along the bottom edge 110 of the display 106. However, it is to be appreciated that one or more selectable elements 104 may be presented anywhere outside of the repositioned and/or scaled window 112, so long as the selectable elements 104 do not occlude or obstruct the game content within the game content window 112. This allows the user 102 to remain focused on playing the video game without hindering the user's 102 ability to see the game content, since it is not occluded by any of the elements 104. In an alternative example to that shown in FIG. 1, the user 102 may swipe down at a top edge of the display 106, which may cause the game content window 112 to shift downwards and the selectable elements 104(1)-(5), or different selectable elements 104, to appear along the top edge of the display 106. In other words, the controller system disclosed herein may make a determination as to which direction to move the window 112 based on a directionality and/or the location of a swipe gesture, and/or the system may determine, on-the-fly, which selectable elements 104 to surface on the display 106 based on the directionality and/or the location of the swipe gesture. Accordingly, the user 102 may familiarize himself/herself with specific elements 104 that can be surfaced by swiping up from the bottom, swiping down from the top, swiping right from the left, or swiping left from the right. In other implementations, a predefine set of selectable elements 104 may be surfaced on the display 106 regardless of the type of touch input the user 102 provides (e.g., tap anywhere on the display 106 to surface the elements 104(1)-(5).

The example elements 104(1)-(5) shown in FIG. 1 are selectable, and, upon selection of one of the elements 104, a corresponding action may be performed, the action relating to the video game in some way. For example, the first selectable element 104(1) in the form of a camera icon may, upon selection, cause a still image of the game content presented within the game content window 112 to be captured. As another example, the second and third selectable elements 104(2) and 104(3) may, upon selection, start a chat with a particular player or friend of the user 102. For example, the element 104(2) may be associated with a first player, and the element 104(3) may be associated with a second player. Accordingly, the user 102 may choose which player to chat with during gameplay. FIG. 1 depicts the user 102 selecting the element 104(2), which may cause a dialogue box to be presented to allow the user 102 to input a message (e.g., by speaking into a microphone of the controller 100, typing on a virtual keyboard presented at the bottom of the display 106, etc.), and that message may be sent to the other player for display of the message on a different controller that the other player is using to play the same video game. As another example, the fourth selectable element 104(4) in the form of a chat bubble may, upon selection, cause launch a chat application that can be used to start chatting with any player or group of players the user 102 desires to chat with. As another example, the fifth selectable element 104(5) in the form of a settings icon may, upon selection, allow the user 102 to adjust a setting of the controller 100, such as which controls are enabled, or a reconfiguration of the controls and how they map to game input, etc. These are merely examples, and other types of augmentative content may be presented, and any number of selectable elements 104 may be displayed, such as a single element 104, fewer than five elements 104, or more than five elements 104.

The processes described herein are illustrated as collections of blocks in logical flow diagrams, which represent a sequence of operations, some or all of which may be implemented in hardware, software, firmware or a combination thereof (sometimes referred to herein as "logic"). In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 2:
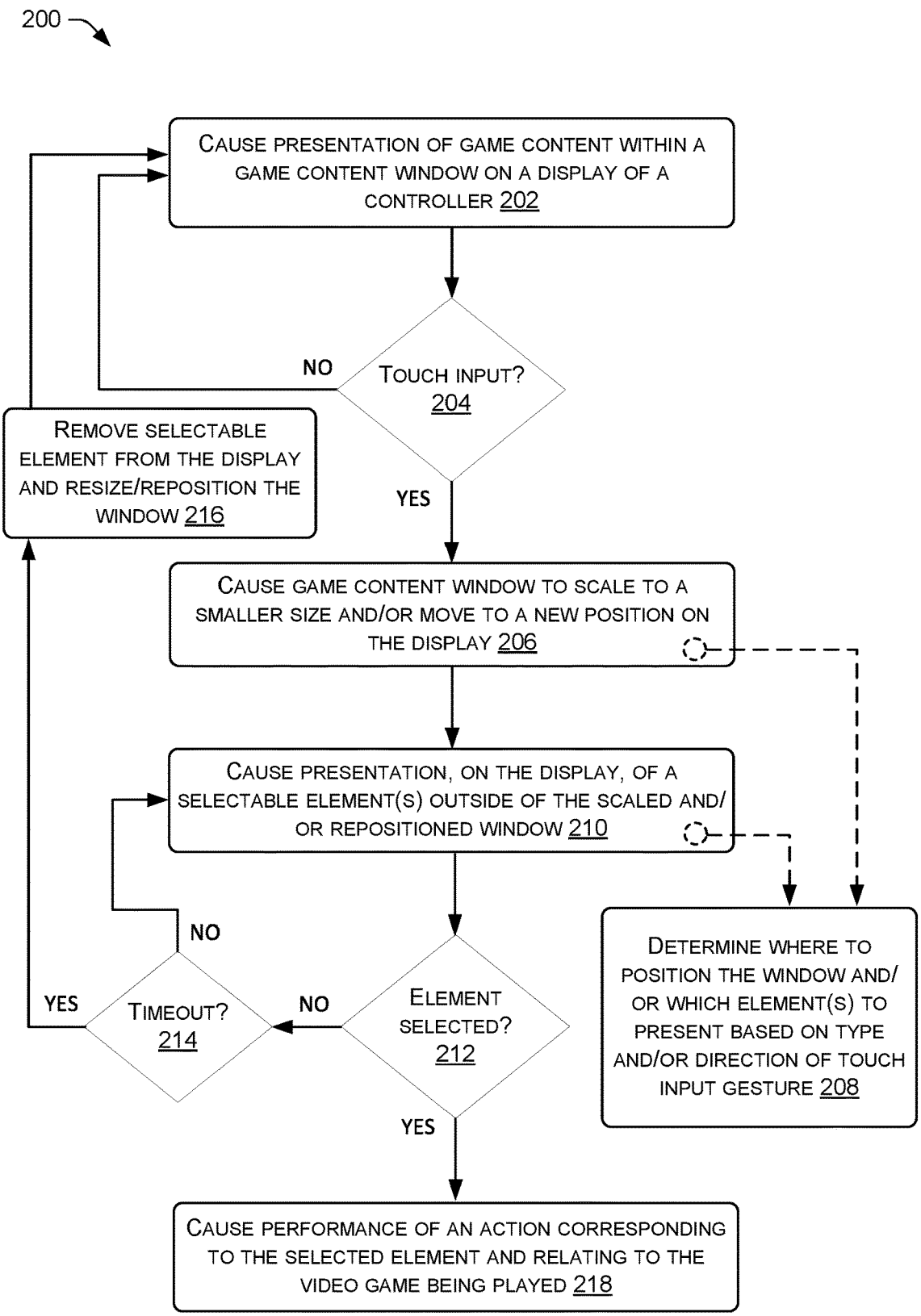
FIG. 2 illustrates an example process for surfacing one or more selectable elements on a display of a controller in response to touch input provided on the display and without occluding game content being displayed within a game content window.

FIG. 2 illustrates an example process 200 for surfacing one or more selectable elements on a display 106 of a controller 100 in response to touch input provided on the display 106 and without occluding game content being displayed within a game content window 112. In some instances, the process 200 may be performed by the controller 100 and/or a remote device communicatively coupled to the controller 100.

At 202, a processor(s) of a controller system, as disclosed herein, may cause presentation of game content within a game content window 112 on a display 106 of a controller 100. An example of this is shown in FIG. 1 at time 108(1). As described herein, the display 106 may be a touch sensitive display, and the game content may be associated with a video game. The video game may be executing on the controller 100 as a standalone gaming system, or on a connected device external to the controller 100, such as a PC, a game console, a server computer, etc. The window 112 may be presented on the display 106 at any suitable size and position on the display 106, such as in the center of the display 106 at a size that spans the entire display 106 or most of the display 106 but now all of the display 106.

At 204, the processor(s) may determine whether touch input has been provided on the display 106, such as during the presentation of the game content within the game content window 112. For example, the processor(s) may receive an indication that touch input was provided on the display 106. For example, a user 102 may touch the display 106 causing the indication (e.g., touch data, such as capacitive data from a capacitive array in the display stack) to be received by the processor(s) at block 204. If no touch input was provided at block 204, the process 200 may follow the NO route from block 204 back to block 202 where the game content continues to be presented within the game content window 112. If the processor(s) received an indication that touch input was provided on the display 106, the process 200 may follow the YES route from block 204 to block 206. Although touch input is described as one example trigger for surfacing selectable elements on the display 106, other example triggers are contemplated, such as the occurrence of an in-game event, a voice input uttered by the user and captured by a microphone of the controller 100, etc.

At 206, the processor(s) may, in response to receiving the indication of the touch input, cause the game content window 112 to scale to a smaller size game content window and/or move from a current position on the display 106 to a new position on the display 106 as a repositioned game content window 112. An example of this is shown in FIG. 1 at time 108(2), where the window 112 has shifted upwards on the display 106 and scaled to a slightly smaller size window 112. It is to be appreciated that the window 112 may be repositioned in any suitable direction (e.g., up, down, left, right, or a combination thereof) from its current position. In some instances, the direction in which the window 112 is moved or shifted on the display 106 at block 206 is predetermined (e.g., any touch input may cause the window 112 to shift up or to shift down). In some implementations, the direction in which the window 112 is moved or shifted on the display 106 at block 206 is not predetermined, and is instead determined on-the-fly (or dynamically) based on the type and/or direction of the touch input provided on the display 106. This is shown at block 208 in that the processor(s) may determine that a particular type of gesture (e.g., a swipe gesture) was provided in a particular direction (e.g., an upward direction, a downward direction, etc.) at a particular location or region (e.g., a bottom edge, a top edge, etc.) of the display 106. This may be determined at block 208 by virtue of the indication of the touch input indicating the type of gesture, the direction of the gesture, and/or a location or region on the display 106 where the gesture was provided. Thus, at block 208, the processor(s) may dynamically determine where to position the game content window 112 at block 206 (e.g., by moving the window 112 upwards, downwards, etc.) based on the type and/or direction of the touch input gesture.

At 210, the processor(s) may cause presentation, on the display 106, of one or more selectable elements 104 outside of the game content window 112 (e.g., along an edge of the display 106), the window 112 now a smaller size and/or in a different position than before. The selectable elements 104 may be selectable to cause performance of one or more corresponding actions that relate to the video game, as described herein. For example, the user 102 may start a chat session by selecting a selectable element 104, or the user 102 may screen-shot the game content being presented so that the user 102 can share a still image of the game with a friend, or the user 102 may adjust a setting of the controller 100, among other possible actions. In some instances, the particular elements 104 presented outside of the window 112 at block 210 are predetermined (e.g., any touch input may cause a predefined set of elements 104 to be displayed). In some implementations, the elements 104 presented may not be predetermined, and instead a set of one or more selectable elements 104 may be determined on-the-fly (or dynamically) based on the type and/or direction of the touch input provided on the display 106. This is shown at block 208 in that the processor(s) may determine that a particular type of gesture (e.g., a swipe gesture) was provided in a particular direction (e.g., an upward direction, a downward direction, etc.) and/or at a particular location or region (e.g., a bottom edge, a top edge, etc.) of the display 106. Thus, at block 208, the processor(s) may dynamically determine a set of selectable elements 104 to be presented at block 210 (e.g., by moving the window 112 upwards, downwards, etc.) based on the type and/or direction of the touch input gesture. That is, swiping up from the bottom edge of the display 106 may cause a first set of elements 104 to be surfaced on the display 106, swiping down from the top edge of the display 106 may cause a second set of elements 104 to be surfaced on the display, swiping right from the left edge of the display 106 may cause a third set of elements 104 to be surfaced on the display 106, and swiping left from the right edge of the display 106 may cause a fourth set of elements 104 to be surfaced on the display 106. In other embodiments, specific types of gestures may be associated with specific sets of elements 104 or icons, such as displaying a first set of elements 104 in response to a touch or a tap on the display 106, displaying a second set of elements 104 in response to a touch and hold gesture made on the display 106, displaying a third set of element 104 in response to a swipe gesture, and so on.

At 212, the processor(s) may determine whether a selectable element 104 has been selected. In other words, the processor(s) may receive a second indication that second touch input was provided on the display 106 at a location of a selectable element 104 (or a location on the display 106 where the selectable element 104 is displayed). If no elements 104 are selected, the process 200 may follow the NO route from block 212 to block 214. At 214, if a timeout has not occurred since initially displaying the selectable element(s) 104 at block 210, the process 200 may follow the NO route from block 214 to continue displaying the selectable element(s) 104 outside of the game content window 112. If a timeout 214 has occurred, the process 200 may follow the YES route from block 214 to block 216 where the selectable element(s) 104 is/are removed from the display 106, and the game content window 112 reverts to its original size and/or position on the display 106, and the process 200 may iterate from block 202.

If, at block 212, an element 104 is selected by the processor(s) receiving a second indication that second touch input was provided on the display 106 at a location of the element 104, the process 200 may follow the YES route from block 212 to block 218. At 218, the processor(s) may cause performance of an action corresponding to the selected element 104, such as starting a chat session, capturing a still image of the game content presented on the display 106, adjusting a controller 100 setting(s), etc.

In some instance, menus may be presented on various portions of the display, or at various locations on the display. For example, the menus may be presented along a top edge of the display, a bottom edge of the display, a left edge of the display, and/or a right edge of the display. Within each menu may be selectable icons that, when selected, cause one or more action(s) to be performed. Additionally, or alternatively, in some instances, selecting an icon may cause one or more sub-menus to be presented. These sub-menus may offer further options or actions for the user to select among.

Figure 3:
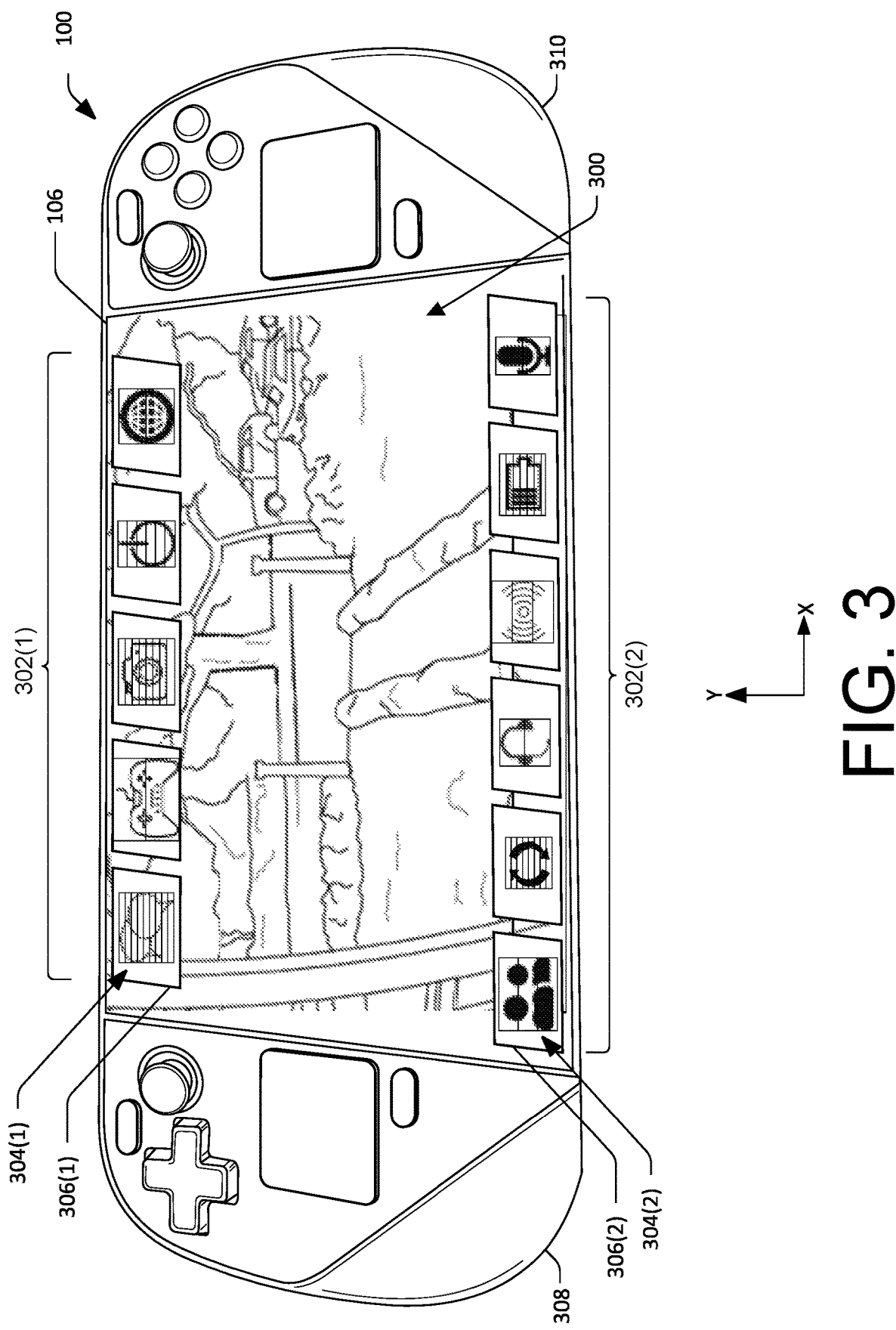
FIG. 3 illustrates a front view of the handheld controller of FIG. 1, showing content and one or more menus presented on the display.

FIG. 3 illustrates a front view of the controller 100, showing content 300 and one or more menus 302(1) and 302(2) being presented on the display 106. The content 300 presented on the display 106 may correspond to content within a gameplay environment of a game being operated at least in part by the controller 100. For example, the content 300 may include scenes or levels within a game. However, the content 300 may include any other form of content capable of being displayed (e.g., videos, streams, etc.).

The menus 302(1) and 302(2) are shown being displayed along a top edge and a bottom edge of the display 106. The menus 302(1) and 302(2) may be considered a first menu, or first menus, displayed on the display 106 (e.g., the menus may include a first menu (the menu 302(1)) and a second menu (the menu 302(2))). As shown, the menu 302(1) may extend horizontally across or along the top edge of the display 106, between a left-hand side of the display 106 and a right-hand side of the display 106. The menu 302(2) may extend horizontally across or along the bottom edge of the display 106, between a left-hand side of the display 106 and a right-hand side of the display 106. As discussed herein, the menus 302(1) and/or 302(2) may be presented on the display 106 based on receiving touch input at particular portions of, or anywhere on, the display 106, and/or the user may utilize one or more of the front-surface control(s) for causing the menus 302(1) and 302(2) to be displayed (e.g., trackpad, buttons, etc.), and/or the menus 302(1) and 302(2) may be persistently displayed during gameplay. In some embodiments, the user may configure how the menus 302(1) and 302(2) are to be displayed (e.g., in response to touching the display 106, at all times during gameplay, etc.), and/or where on the display 106 the menus 302(1) and 302(2) are to be presented by setting preferences in user settings or device settings.

In some instances, the user may press or touch on various portions of the display 106 to surface the first menu(s) 302(1) and/or the second menu(s) 302(2). For example, the user may provide touch input on/along a top edge of the display 106 to present the first menu(s) 302(1). Providing touch input on/along the top of the display 106 may cause the first menu(s) 302(1) to surface along the top edge of the display 106 and/or along the bottom edge of the display 106. In some instances, the user may provide touch input on/along a bottom edge of the display 106 to surface the first menu(s) 302(1). In other examples, the user may provide touch input anywhere on the display 106 to surface the first menu(s) 302(1). Similarly, in some instances, the user may provide touch input on/along a left edge or a right edge of the display 106 to present second menu(s) 302(2). Providing touch input on/along the left or right edge of the display 106 may cause the second menu(s) 302(2) to surface along the left-hand edge of the display 106 and/or along the right-hand edge of the display 106. In some instances, the user may provide touch input anywhere on the display 106 to surface the second menu(s) 302(2). The first menu(s) 302(1) and/or the second menu(s) 302(2) may be presented one at a time or may be displayed simultaneously. For example, the display 106 may only present one of the first menu(s) 302(1) or the second menu(s) 302(2) at a time or may present both of the first menu(s) 302(1) and the second menu(s) 302(2) on the display 106 simultaneously. In some instances, a first menu 302(1) (of the first menus) may be presented along the top edge of the display 106, a second menu 302(1) (of the first menus) may be presented along the bottom edge of the display 106, a third menu (of the second menus) may be presented along a left edge of the display 106, and a fourth menu (of the second menus) may be presented along the right edge of the display 106.

The menus 302(1) and 302(2) are shown being overlaid (e.g., on top of, in front of, etc.) on the content 300 presented on the display 106. The menus 302(1) and 302(2) may obstruct portions of the content 300 being viewable on the display 106, in some embodiments. In some embodiments, the menus 302(1) and 302(2) can be semi-transparent to allow for some visibility of the content 300 behind the menu icons. Displaying the content 300 in conjunction with the menus 302(1) and 302(2) may permit the user to interact within the content 300 while also interacting with the menus 302(1) and 302(2).

The menu(s) 302(1) and 302(2) may include icon(s) that represent various action(s) which, when selected, are performed by the controller 100 and/or a communicatively coupled computing device (e.g., gaming console). Each of the icon(s) may be associated with a corresponding action(s). In this sense, the user may select icon(s) for causing associated actions to be performed. For example, menu 302(1) is shown including icons 304(1) and the menu 302(2) is shown including icons 304(2). The icons 304(1) may extend horizontally along the top edge of the display 106 and the icon(s) 304(2) may extend horizontally along the bottom edge of the display 106. The icons 304(1) and 304(2) may include indicia or symbols that represents an associated action that is performed when the icons 304(1) and/or 304(2) are selected. For example, the user may press or touch on the icons 304(1) and 304(2) for causing an associated action to be performed.

In some instances, the action(s) associated with the icons 304(1) and 304(2) may be action(s) which do not affect the game or application being controlled. Stated alternatively, the action(s) associated with the icons 304(1) and 304(2) may be external or ancillary to the game or application (e.g., not game controls) or ancillary to a gameplay environment, and it may not impact or cause action(s) to be performed within the game itself. For example, the icons 304(1) and 304(2) may be associated with opening chat boxes or communication interfaces with friends, adjusting controller settings, capturing a screenshot of the display 106, powering the controller 100 on/off, searching the web, finding friends, switching users, using a headset, network connectivity, battery life, and/or recording audio. Nevertheless, at least some of these actions may still be related to the video game in some way, even if they do not directly affect the video game. For example, a chat session with a friend who is also playing the same video game may be considered to be an action that is related to the video game, even though it does not control an aspect of the video game itself. While a few examples have been described, the menu(s) 302(1) and/or 302(2) may include other icons 304(1) and/or 304(2), respectively. In some instances, each of the icons 304(1) and/or 304(2) may be presented in boxes, containers, or other areas 306(1) and 306(2), respectively.

While the menus 302(1) and 302(2) are illustrated having a certain number of icons 304(1) and 304(2), respectively, the menu(s) 302(1) and 302(2) may include more or fewer icons than shown. Additionally, the menus 302(1) and 302(2) may include a different or similar number of icon(s) as shown, and/or the menus 302(1) and 302(2) may include a different or similar number of icon(s) as one another. For example, the menu 302(1) may include two icons and the menu 302(2) may include three icons. In some instances, the icons 304(1) and 304(2) (or the areas 306(1) and 306(2)) may be equally distributed on the display 106 (e.g., equidistantly spaced). Moreover, the icons 304(1) and 304(2) may be centered on the display 106 along the top edge and the bottom edge (e.g., Y-axis). Additionally, although the menus 302(1) and 302(2) are shown being presented on a certain portion of the display 106, the menus 302(1) and 302(2) may be presented elsewhere on the display 106.

Further, in some instances, the menu 302(1) may be presented on the display 106 while the menu 302(2) is not presented on the display 106, or the menu 302(2) may be presented on the display 106 while the menu 302(1) is not presented on the display 106.

As noted above, the user may touch the icons 304(1) and 304(2) for causing a corresponding action to be performed. For example, if the user wishes to take a screenshot (e.g., capture a still image) of the content 300 presented on the display 106, the user may touch a corresponding icon (e.g., the camera icon). Upon the user touching this icon, the controller 100 or a communicatively coupled computing device(s) (e.g., gaming console), may cause a screenshot of the content 300 to be captured. By way of another example, if the user wishes to have a conversation with her or her friends (e.g., while playing a video game), the user may touch a corresponding icon (e.g., the dialogue bubble icon). Therein, the controller 100 or a communicatively coupled computing device(s) may cause a dialogue box to be surfaced on the display 106 within which the user may type. In some instances, upon selecting an icon 304(1) within the first menu(s) 302(1) (e.g., the dialogue bubble icon), the user may choose which friend to engage in conversation with and subsequently, a dialogue box may be presented on the display 106. In turn, the user may engage in conversation within his or her friend. For example, the user may record audio for their friend or type in a dialogue box. As such, each of the icons 304(1) and 304(2) may be associated with corresponding action(s) performable by the controller 100 and/or a communicatively couple device(s). For example, the action(s) may include taking a screenshot of the display (e.g., capturing an environment of the game), surfacing social features (e.g., chatting with friends), adjusting controller settings (e.g., layout, configuration, etc.), enabling a microphone (e.g., record audio), or finding friends. The icon(s) 304(1) and 304(2) may be determined based on the game being played by the user or the content 300 being displayed on the display 106. In some instances, the user may customize which icons are populated within the menus 302(1) and/or 302(2), and/or or the menus 302(1) and/or 302(2) may be populated with predetermined icons. In some instances, the user may scroll through the icons 304(1) and 304(2) of the menus 302(1) and 302(2) for viewing additional icons, such as with a carousel implementation (e.g., right and left scrolling using a sideways finger swipe gesture on the display 106).

In some instances, the user may access the menus 302(1) and 302(2) while holding a left handle 308 and/or a right handle 310 of the controller 100 in the hands of the user. For example, left finger(s) and/or right finger(s) of the user may reach the icons 304(1) and/or 304(2) of the menus 302(1) and 302(2), respectively. In some instances, however, the user may remove his or her hands from the left handle 308 and/or the right handle 310 for accessing the menus 302(1) and/or 302(2). In some instances, however, the user may scroll through the icons 304(1) and 304(4) using one or more of the front-surface controls (e.g., trackpad, D-pad, button, etc.). This may be useful if a user does not wish to remove his/her hands from the handles 308 and 310 in order to select an icon 304. The way in which the icons 304 are selected may be configured by the user by setting preferences in user settings or device settings.

The first menu(s) 302(1) and/or the second menu(s) 302(2) may be removed from the display 106 after the user has made a selection of an icon, or after the associated action is performed. Additionally, or alternatively, the first menu(s) 302(1) and/or the second menu(s) 302(2) may be removed upon the user pressing button(s) within the game (e.g., fire, moving joystick, etc.). In other instances, the user may provide touch input on the display 106, outside of the first menu(s) 302(1) and/or the second menu(s) 302(2) (e.g., a center of the display 106). In this sense, when the user returns to the game, the first menu(s) 302(1) and/or the second menu(s) 302(2) may be removed from the display 106. However, the user may resurface the first menus 302(1) and/or the second menu(s) 302(2) by providing touch input as outlined above. In some instances, the first menu(s) 302(1) and/or the second menu(s) 302(2) may remain displayed as the user interacts within the game environment.

Figure 4:
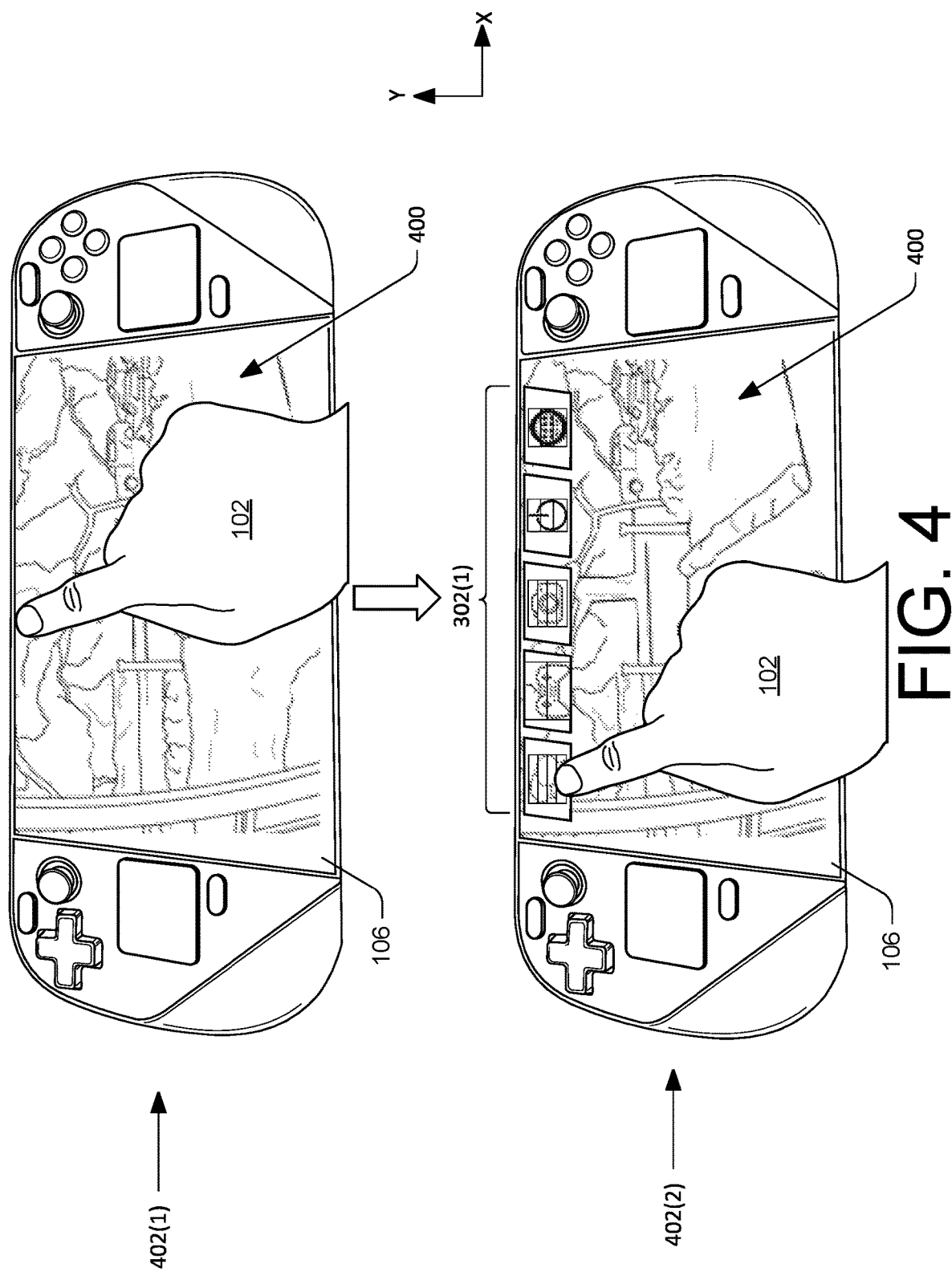
FIG. 4 illustrates a front view of the handheld controller of FIG. 1 and a user interacting with the handheld controller. In some instances, the user may touch or perform certain gestures on the display to surface one or more menus.

FIG. 4 illustrates a user 102 interfacing or interacting with the display 106 for surfacing menu(s) while displaying content 400 (e.g., game content of a video game). For example, at a first time or instance 402(1), the user 102 may touch or press along and/or on a top edge of the display 106. Noted above, the display 106 may be touch sensitive for detecting the touch input along and/or on the top edge (and/or other areas of the display 106). The display 106 may include components configured to detect a presence and a location of the touch input on the display 106. In some instances, the user 102 may provide a press having a threshold amount of force along and/or on the top edge of the display 106. Additionally, or alternatively, in some instances, the user 102 may have to provide the touch input for a certain amount of time (e.g., two seconds). Additionally, or alternatively, the user 102 may provide gestures on the display 106 to surface the menu(s). For example, the user 102 may swipe their finger from the top edge towards a center of the display 106.

Regardless of the specific form of touch input provided, the display 106 may surface or present menu(s). For example, as shown, in response to the touch input, at a second time or instance 402(2), the display 106 may present the menu 302(1) along the top edge of the display 106. As discussed previously in FIG. 3, the display 106 may present the menu 302(1) in response to the user 102 providing touch input along the top edge of the display 106. That is, providing touch input along the top edge may cause the menu 302(1) to be presented along the top edge of the display 106. Stated alternatively, in some instances, the display 106 may present a menu at, or proximate to, the location of the received touch input.

In some instances, the display 106 may also present the menu 302(2) in response to receiving the touch input along the top edge of the display 106. That is, although FIG. 4 illustrates the menu 302(1) being surfaced, the menu 302(2) may also, or alternatively, be surfaced. For example, the menus 302(1) and 302(2) may be surfaced together. Additionally, or alternatively, in some instances, the menu 302(2) may be displayed in response to the user 102 providing touch input along and/or on a bottom edge of the display 106. In this sense, the menus 302(1) and 302(2) may be surfaced together via touch input received at/along the top edge and/or at/along the bottom edge, or the menus 302(1) and 302(2) may be surfaced individually via respective inputs being received at/along the top edge and/or at/along the bottom edge, respectively. Still the user may provide a first touch input at/along the top edge for surfacing the menu 302(1) and may then provide a second touch input at/along the bottom edge for surfacing the menu 302(1), or vice versa. In such instances, the display 106 may present the menus 302(1) and 302(2) at the same time. As mentioned above, one or both of the menus 302(1) and 302(2) may be displayed in response to the user touching the display 106 anywhere on the display 106, or the menus 302(1) and 302(2) may be presented all of the time, or in response to events (e.g., events in the game, at particular times, etc.).

After the menus 302(1) and/or 302(2) are displayed, the user 102 may interface with the icons 304(1) and/or 304(2) for causing certain actions to be performed. For example, as shown, at time 402(2) the user may press an icon associated with opening or engaging in a conversation with his or her friend(s) (e.g., the dialogue bubble icon). In response to selection of this icon, the display 106 may present a dialogue box for engaging in a conversation with his or her friend(s). In some instances, after making a selection of an icon, and/or after a period of time where no touch input is received on the display 106 (e.g., after a timeout), the menus 302(1) and/or the 302(2) may disappear or be removed from being presented on the display 106. In line with the above example, after pressing the dialogue bubble icon, the menu 302(1) may disappear and the display 106 may present the dialogue box. Additionally, or alternatively, the menu 302(1) (or the menu 302(2)) may disappear upon the display 106 receiving touch input outside of the menu 302(1) (or the icons 304(1)). For example, the user 102 may provide touch input in/at a center of the display 106, which may cause the menu 302(1) to disappear. Still, in some instances, the user 102 may press one or more of the front-surface controls (e.g., left joystick, right joystick, left trackpad, right trackpad, etc.) for removing the menu 302(1) from the display 106.

In some instances, rather than providing touch input on the display 106 to surface selectable elements and/or menus 302(1) and/or 302(2), the user 102 may press on a button of the controller 100 or utter a voice command (e.g., "[wakeword], menu") for surfacing the menus 302(1) and/or 302 (2). After the menus 302(1) and/or 302(2) are surfaced, the user 102 may provide touch input to the icons 304(1) and/or 304(2) for selecting an action, or may toggle or scroll through the icons 304(1) and/or 304(2) using one or more of the front-surface controls. After the menus 302(1) and/or 302(2) are removed from the display 106, the user 102 may again provide touch input on portions of the display 106 for surfacing the menus 302(1) and/or 302(2).

Figure 5:
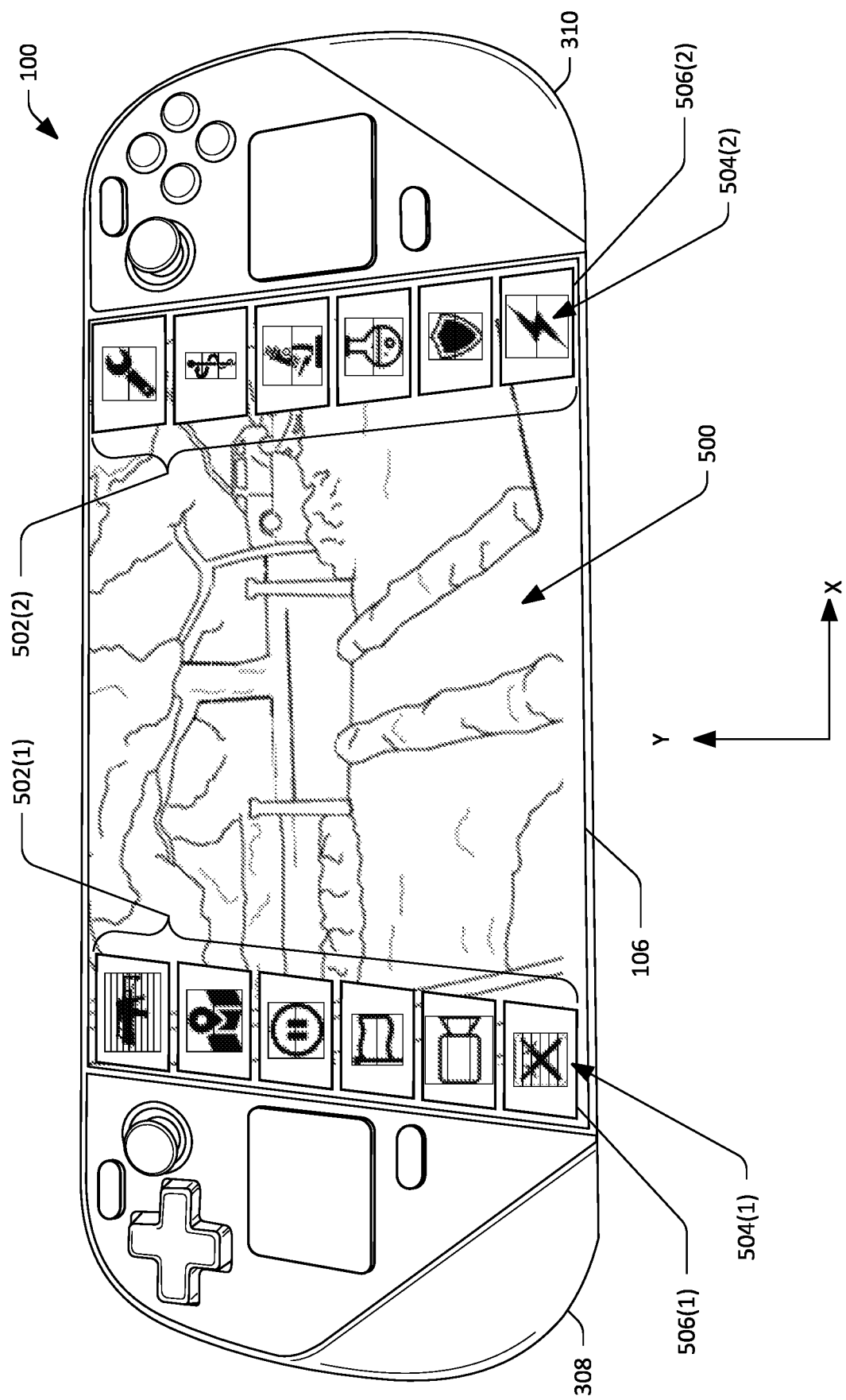
FIG. 5 illustrates a front view of the handheld controller of FIG. 1, showing content and one or more menus presented on the display.

FIG. 5 illustrates a front view of the controller 100, showing content 500 and one or more menu(s) 502(1) and 502(2) being presented on the display 106. The content 500 presented on the display 106 may correspond to content within a gameplay environment of a game being operated at least in part by the controller 100. For example, the content 500 may include scenes or levels within a game. However, the content 500 may include any other form of content capable of being displayed (e.g., videos, streams, etc.).

The menus 502(1) and 502(2) are shown being displayed along a left-hand edge (or left-hand side) and a right-hand edge (or right-hand side) of the display 106. The menus 502(1) and 502(2) may be considered a second menu, or second menus, displayed on the display 106 (e.g., the menus may include a first menu (the menu 502(1)) and a second menu (the menu 502(2))). The menus 302(1) and 302(2), discussed above with regard to FIGS. 3 and 4, may be considered a first menu, or first menus. However, in some instances, the menu 302(1) may be considered a first menu, the menu 302(2) may be considered a second menu, the menu 502(1) may be considered a third menu, and/or the menu 502(2) may be considered a fourth menu.

As shown, the menu 502(1) may extend vertically along the left-hand side of the display 106, between a bottom of the display 106 and a top of the display 106. The menu 502(2) may extend vertically along the right-hand side of the display 106, between the top of the display 106 and the bottom of the display 106. As discussed herein, the menus 502(1) and/or 502(2) may be presented on the display 106 based on receiving touch input at particular portions of the display 106 and/or the user may utilize one or more of the front-surface control(s) for causing the menus 502(1) and 502(2) to be displayed (e.g., trackpad, buttons, etc.). In some embodiments, one or both of the menus 502(1) and 502(2) may be displayed at all times during gameplay, or in response to events (e.g., events in the game, at particular times, etc.).

The menus 502(1) and 502(2) are shown being overlaid (e.g., on top of, in front of, etc.) on the content 500 presented on the display 106. The menus 502(1) and 502(2) may obstruct portions of the content 500 being viewable on the display 106. For example, while playing game, the display 106 may present various content associated with an environment of the video game. If the user wishes to change weapons, for example, the user may provide touch input on a left-hand side and/or a right-hand side of the display 106. Therein, the second menu(s) 502(1) and/or 502(2) may be surfaced on the display 106. The display 106 may therefore display the content associated with the environment of the game as well as the second menu(s) 502 (e.g., for allowing the user to change weapons). In such instances, the second menu(s) 502 may occupy a portion of the display 102 (e.g., along the left-hand side and/or along the right-hand side). In some embodiments, the menu icons may be semi-transparent such that the content 500 behind the menu icons is at least partially visible. Displaying the content 500 in conjunction with the menus 502(1) and 502(2) may permit the user to interact within the content 500 while also interacting with the menus 502(1) and/or 502(2).

The menu(s) 502(1) and 502(2) may include icon(s) that represent various action(s) which, when selected, are performed by the controller 100 and/or a communicatively coupled computing device (e.g., gaming console). Each of the icon(s) may be associated with a corresponding action(s). In this sense, the user may select icon(s) for causing associated actions to be performed. For example, menu 502(1) is shown including icons 504(1) and the menu 502(2) is shown including icons 504(2). The icons 504(1) may extend vertically along a left edge of the display 106, and, therefore, the icons 504(1) are likely accessible to the left thumb of the user 102 while the user is holding the left handle 308. Likewise, the icon(s) 504(2) may extend vertically along the right edge of the display 106, and, therefore, the icons 504(2) are likely accessible to the right thumb of the user 102 while the user is holding the right handle 310. The icons 504(1) and 504(2) may include indicia or symbols that represents an associated action that is performed when the icons 504(1) and 504(2) are selected. For example, the user may press or touch on the icons 504(1) and 504(2) for causing an associated action to be performed.

In some instances, the action(s) associated with the icons 504(1) and 504(2) may be action(s) which affect the video game or application being controlled or executed. Stated alternatively, the action(s) associated with the icons 504(1) and 504(2) may be used to control one or more aspects of the video game, or may modify aspects of the video game being played. Accordingly, the icons 504(1) and 504(2) may be selected to cause performance of actions that are more directly related to the video game, while the icons 304(1) and 304(2) discussed above may be selected to cause performance of actions that are more tangentially related to the video game (e.g., adjust controller settings, chat with other players, take a screenshot of the game content, etc.). For example, the icons 504(1) and 504(2) may be associated with firing a weapon, changing weapons, moving a player-controlled character, opening or viewing a map associated with the video game (e.g., a map of the virtual game world), pausing the game, locating or viewing an objective, changing a camera angle, changing outfits or armor of a user's character within the game, teleporting, repairing, upgrading health, and so forth. These icons 504(1) and 504(2) may be considered shortcut features (e.g., game controls) and the user may touch the selectable icons for performing actions within the video game. The actions corresponding to the icons 504, when performed, may be carried out within the game and may be reflected within the content 500. In this sense, the action(s) performable by selecting the icon(s) 504(1) and 504(2) may include actions within the game or actions that are performable by the game (e.g., changing weapons). Compared to the menus 302(1) and 302(2), which are actions external or ancillary to the video game (e.g., chat box), the menus 502(1) and 502(2) may be associated with actions that are performed within the game. That said, as mentioned elsewhere herein, the actions associated with the menus 302 may still be considered to be related to the video game; just more tangentially related. In other words, the actions associated with the icons or selectable elements described herein are tied to the video game in some way, rather than being unrelated to the video game, which may be the case with a notification of an email or a text message that is entirely unrelated to the video game or a video game platform on which the game is being played. While a few examples have been described, the menu(s) 502(1) and/or 502(2) may include other icons 504(1) and/or 504(2), respectively, for providing extra game controls. In some instances, each of the icons 504(1) and/or 504(2) may be presented in boxes, containers, or other areas 506(1) and 506(2), respectively.

While the menus 502(1) and 502(2) are illustrated having a certain number of icons 504(1) and 504(2), respectively, the menu(s) 502(1) and 502(2) may include more or less icons than shown. Additionally, the menus 502(1) and 502(2) may include a different or similar number of icon(s) as shown, and/or the menus 502(1) and 502(2) may include a different or similar number of icon(s) as one another. For example, the menu 502(1) may include two icons and the menu 502(2) may include three icons. In some instances, the icons 504(1) and 504(2) (or the areas 506(1) and 506(2)) may be equally distributed on the display 106 (e.g., equidistantly spaced). Moreover, the icons 504(1) and 504(2) may be centered on the display 106 along the top edge and the bottom edge (e.g., X-axis). Additionally, although the menus 502(1) and 502(2) are shown being presented on a certain portion of the display 106, the menus 502(1) and 502(2) may be presented elsewhere on the display 106. Further, in some instances, the menu 502(1) may be presented on the display 106 without the menu 502(2), or vice versa. Yet, the display 106 may present the menus 302(1) and 302(2) in conjunction with the menus 502(1) and 502(2). Additionally, or alternatively, the display 106 may present one or more of the menus 302(1) and 302(2) in conjunction with one or more of the menus 502(1) and 502(2).

The menus 502(1) and 502(2) may be presented on the display 106 at all times during gameplay, or the menus 502(1) and 502(2) may surface in response to user input and/or in response to certain events (e.g., events in the game, at particular times, etc.). In some instances, instead of overlaying the game content 500, a game content window 112 may be scaled and/or repositioned, as described herein to accommodate side areas or regions 506(1) and 506(2) of the display 106 to present the menus 502(1) and 502(2) outside of the game content window 112 without occluding the game content 112. Again, this is feasible with the game content 500 being associated with an aspect ratio that is smaller than an aspect ratio of the display 106 so as to preserve fidelity of the game content upon resizing a game content window 112 within which the game content is presented.

With the menus 502(1) and 502(2) surface on the display 106, the user may touch or press on an icon 504 to cause the action to be performed. For example, the user may select an icon 504 (e.g., the gun icon) associated with firing a weapon, changing a weapon, etc. Upon the user pressing this icon 504, the controller 100 or a communicatively coupled computing device(s) (e.g., gaming console) may open a sub-menu (or cause a sub-menu to be opened) that allows the user to select among available weapons. For example, if the action is changing a weapon, the user may scroll through various weapons (e.g., bow and arrow, handgun, etc.) and select a desired weapon, and the weapon of the user's character within the game may be updated. By way of another example, if the user wishes to view a map of the game (e.g., level, scene, etc.), the user may select a corresponding icon (e.g., the map icon). Therein, the controller 100 or a communicatively coupled computing device(s) may cause a pop-up window to be presented and/or the content 500 to be updated to display a map. The user may then engage with the map for viewing destinations, setting objections, and so forth. Still, if the user wishes to heal their character (e.g., administer portion, rest, or so forth), the user may select a corresponding icon (e.g., health icon). As such, each of the icons 504(1) and 504(2) may be associated with corresponding action(s) performable by the controller 100 and/or a communicatively couple device(s). These are merely example types of actions that can be performed by an icon 504 of the second menu(s) 502.

A determination of which icon(s) 504(1) and 504(2) to present, from among a larger superset of available icons 504, may be based on the game being played by the user or the content 500 being displayed. For example, based on the particular game being played, certain icon(s) may be displayed for causing actions associated with the particular game to be carried out. That is, knowing the game allows for the actions associated with that game to be determined, and correspondingly, the menu(s) 502(1) and 502(2) to be populated. In some instances, the user may customize which icons are populated within the menus 502(1) and/or 502(2), and/or or the menus 502(1) and/or 502(2) may be populated with predetermined icons. In some instances, the user may scroll through the icons 504(1) and 504(2) of the menus 502(1) and 502(2) for viewing additional icons.

In some instances, the user may access the menus 502(1) and 502(2) while holding the left handle 308 and/or the right handle 310 in the hands of the user. For example, left finger(s) and/or right finger(s) of the user may reach the icons 504(1) and/or 504(2) of the menus 502(1) and 502(2), respectively. In some instances, however, the user may remove his or her hands from the left handle 308 and/or the right handle 310 for accessing the menus 502(1) and/or 502(2). In some instances, however, the user may scroll through the icons 504(1) and 504(4) using one or more of the front-surface controls (e.g., trackpad). Positioning the menus 502(1) and 502(2) along the left and right sides, respectively, of the display 106 allows for the icons 504(1) to be within range of the left thumb of the user and the icons 504(2) to be within range of the right thumb of the user. As a result, the user may be able to select an icon 504 without removing his/her hands from the handles 308 and 310. In some implementations, in order to avoid spurious input of the icons 504 by inadvertent touches, a pressure sensor(s) may be associated with the icons 504 in order to register an input event for selecting an icon 504 if an amount of force of a press satisfies (e.g., meets or exceeds, strictly exceeds, etc.) a threshold. Any suitable type of pressure sensor may be utilized at the left and/or right edge(s) of the display 106 for this purpose, including, without limitation, force sensing resistors (FSRs), force sensing capacitors (FSCs), piezoelectric pressure sensors, load cells, strain gauges, or the like.

Figure 6:
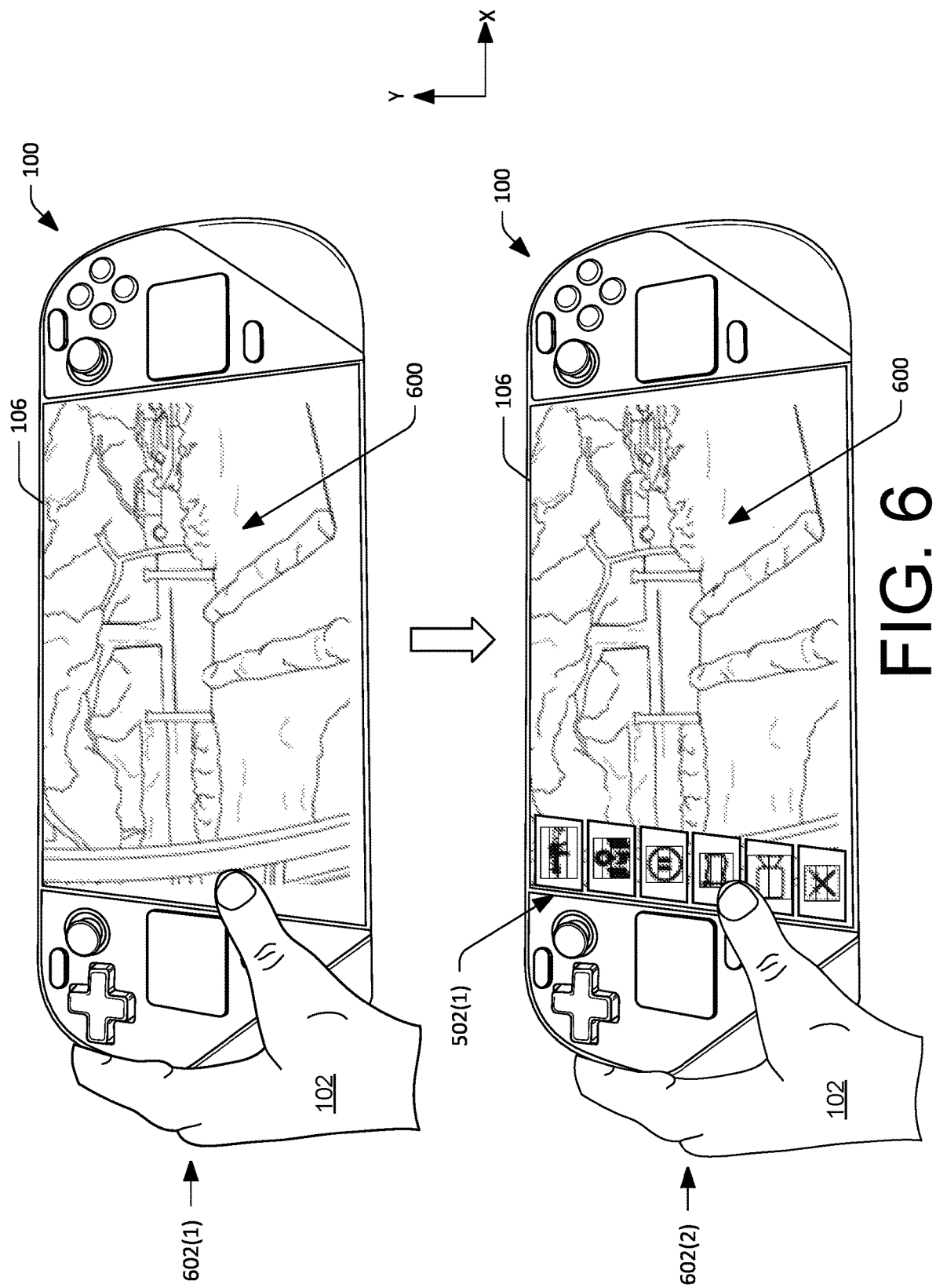
FIG. 6 illustrates a front view of the handheld controller of FIG. 1 and a user interacting with the handheld controller. In some instances, the user may touch or perform certain gestures on the display to surface one or more menus.

FIG. 6 illustrates a user 102 interfacing or interacting with the controller 100 and the display 106 for surfacing menu(s) while game content 600 is displayed. For example, at a first time or instance 602(1), the user 102 may touch or press along and/or on a left edge of the display 106. Noted above, the display 106 may be touch sensitive for detecting the touch input along and/or on the left edge (and/or other areas of the display 106). The display 106 may include components configured to detect a presence and a location of the touch input on the display 106. In some instances, the user 102 may provide a press having a threshold amount of force along and/or on the left edge of the display 106. Additionally, or alternatively, in some instances, the user 102 may have to provide the touch input for a certain amount of time (e.g., two seconds). Additionally, or alternatively, the user 102 may provide gestures on the display 106 to surface the menu(s). For example, the user 102 may swipe their finger from the (left) edge of the display 106 towards a center of the display 106.

Regardless of the specific form of touch input provided, the display 106 may surface or present menu(s). For example, as shown, in response to the touch input, at a second time or instance 602(2), the display 106 may present the menu 502(1) along the left edge of the display 106. As discussed previously in FIG. 5, the display 106 may present the menu 502(1) in response to the user 102 providing touch input along the left edge of the display 106. That is, providing touch input along the left edge may cause the menu 502(1) to be presented along the left edge of the display 106. Stated alternatively, in some instances, the display 106 may present a menu at, or proximate to the location of the received touch input.

In some instances, the display 106 may also present the menu 502(2) in response to receiving the touch input along the left edge of the display 106. That is, although FIG. 6 illustrates the menu 502(1) being surfaced, the menu 502(2) may also be surfaced. For example, the menus 502(1) and 502(2) may be surfaced together. Additionally, or alternatively, in some instances, the menu 502(2) may be displayed in response to the user 102 providing touch input along and/or on a right edge of the display 106. In this sense, the menus 502(1) and 502(2) may be surfaced together via touch input received at/along the left edge and/or at/along the right edge, or the menus 502(1) and 502(2) may be surfaced individually via respective inputs being received at/along the left edge and/or at/along the right edge, respectively. Still the user may provide a first touch input at/along the left edge for surfacing the menu 502(1) and may then provide a second touch input at/along the right edge for surfacing the menu 502(2), or vice versa. In such instances, the display 106 may present the menus 502(1) and 502(2) at the same time.

After the menus 502(1) and/or 502(2) are displayed, the user 102 may interface with the icons 504(1) and/or 504(2) for causing certain actions to be performed. For example, at 602(2), the user may touch an icon associated with changing weapons (e.g., the weapon icon), viewing a map (e.g., the map icon), or any of the individual icons 504 in the menu 502(1) shown in FIG. 6. If the user were to touch the weapon icon, for example, the display 106 may present a menu, or other form of interface, for allowing the user 102 to switch and/or select among available weapons. In some instances, after making a selection of the weapon or after selecting the weapon icon, the menus 502(1) and/or the 502(2) may disappear or be removed from being presented on the display 106. In line with the above example, after touching the weapon icon, the menu 502(1) may disappear and the display 106 may present a menu for selecting a weapon. Additionally, or alternatively, the menu 502(1) (or the menu 502(2)) may disappear upon the display 106 receiving touch input outside of the menu 502(1) (or the icons 504(1)). For example, the user 102 may provide touch input in a center of the display 106, which may cause the menu 502(1) to disappear. Still, in some instances, the user 102 may press one or more of the front-surface controls (e.g., left joystick, right joystick, left trackpad, right trackpad, etc.) for removing the menu 502(1) from the display 106.

In some instances, rather than providing touch input on the display 106 to surface the menus 502(1) and/or 502(2), the user 102 may press on a button of the controller 100 or utter voice input (e.g., "[wakeword], controls") for surfacing the menus 502(1) and/or 502(2). After the menus 502(1) and/or 502(2) are surfaced, the user 102 may provide touch input to the icons 504(1) and/or 504(2) for selecting an action, or may toggle or scroll through the icons 504(1) and/or 504(2) using one or more of the front-surface controls. In some instances, one or both of the menus 502(1) and 502(2) may be presented at all times during gameplay, or in response to events (e.g., events in the game, at particular times, etc.). After the menus 502(1) and/or 502(2) are removed from the display 106, the user 106 may again provide input (e.g., touch input on portions of the display 106) for surfacing the menus 502(1) and/or 502(2). In some implementations, the menu(s) 502(1) and/or 502(2) disappear from the display 106 after a passage of a period of time (e.g., after a timeout) with no touch input detected on the display 106. Additionally, although not illustrated, the display 106 may present the menu 302(1) and 302(2) in conjunction or unison with the menus 502(1) and 502(2). In such instances, the user may provide touch input to respective icons of the menus for causing the associated actions to be performed.

The elements, icons, and/or menus described herein may provide increased inputs for the user 102 operating the handheld controller 100. For example, rather than including additional buttons on the controller 100 (e.g., outside of the display 106), the display 106 may be configured to surface elements, icons 104, and/or menus (e.g., the first menu(s) 302 and/or the second menu(s) 502) for providing the user with additional inputs. As such, the handheld controllers 100 described herein allow for different arrangements or functionalities to modify the configuration of the controller 100 to meet the needs of different applications (e.g., game titles), users, and the like. The selectable elements or icons may be conveniently accessible by the user, such as finger(s) and/or thumbs of the left hand and/or the right hand, at least sometimes while continuing to hold the controller 100 with both hands on the respective handles 308, 310 (e.g., when icons are presented along the left and/or right edges of the display 106).

Figure 7:
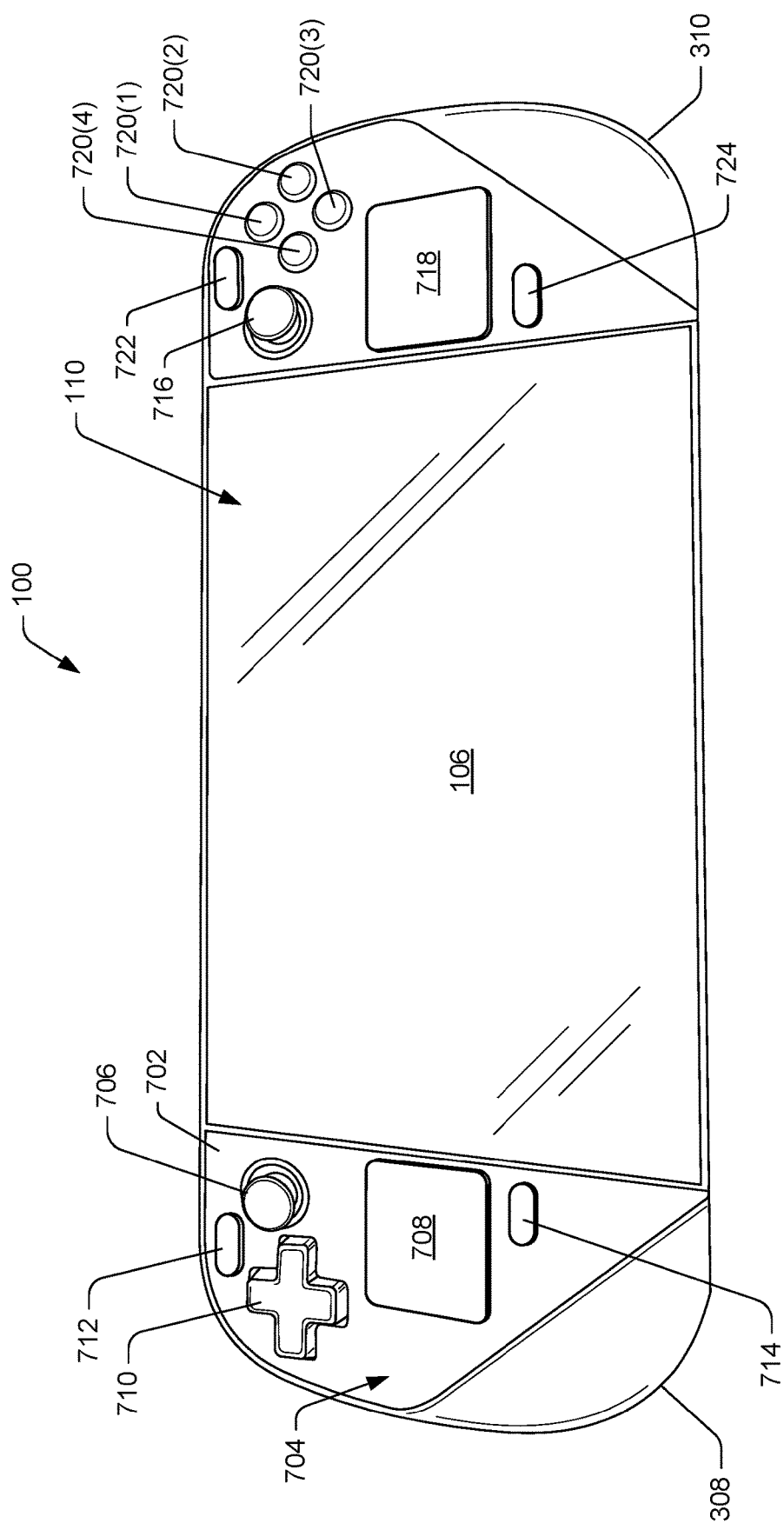
FIG. 7 illustrates a front view of the handheld controller of FIG. 1, illustrating, in part, one or more front-surface controls and a display.

FIG. 7 illustrates a front view of the handheld controller of FIG. 1, illustrating, in part, one or more front-surface controls and a display 106. The controller 100 may include a controller body 702 having a front surface 704. The controller body 702 may further include a back surface (or back), a top surface (or top edge, or top), a bottom surface (or bottom edge, or bottom), a left surface (or left edge, or left), and a right surface (or right edge, or right). Accordingly, the controller body 702 may be a cuboid. The front surface 704 and the back surface may be relatively large surfaces compared to the top, bottom, left, and right surfaces.

As illustrated in FIG. 7, the front surface 704 of the controller body 702 may include a plurality of controls configured to receive input of the user. Touch data generated by the controls may be used to detect a presence, location, and/or gesture of a finger of a user operating the controller 100. In some instances, the front surface 704 of the controller body 702 may include one or more front-surface controls that are, in some instances, controllable by one or more thumbs of the user operating the controller 100. These front-surface controls may include one or more trackpads, trackballs, joysticks, direction pads (e.g., D-pads), buttons, or the like, as described in more detail below. For example, the front surface 704 may include a left joystick 706, a left trackpad 708, and/or a left D-pad 710 controllable by a left thumb of the user. In some embodiments, the front surface 704 may include additional left buttons controllable by the left thumb, such as the button 712 and the button 714. The front surface 704 may also include a right joystick 716, a right trackpad 718, and/or one or more right buttons 720 (1)-(4) (e.g., X, Y, A, and B buttons) controllable by a right thumb of the user. In some embodiments, the front surface 704 may include additional right buttons controllable by the right thumb, such as the button 722 and the button 124. However, the front 704 may include other controls, such as tilting button(s), trigger(s), knob(s), wheel(s), and/or trackball(s), and the plurality of controls may be configured to receive input from any combination of thumbs and/or fingers of the user. In instances where the controller 100 includes trigger(s), the trigger(s) may be multi-direction triggers configured to be pushed away from the controller 100 and pulled towards the controller 100. Moreover, the controller 100 may include paddles, panels, or wings, that are configured to be pushed and/or pulled. The panels may be used to provide additional game controls to the controller 100, such as shifting in a racing game (e.g., pushing may downshift and pulling may upshift).

In some embodiments, the trackpads 708 and 718 are quadrilateral-shaped trackpads. For example, the trackpads 708 and 718 may be generally square-shaped trackpads. Furthermore, the quadrilateral-shaped trackpads 708 and 718 may have rounded corners. Additionally, as shown in FIG. 7, a straight side edge of each trackpad 708 and 718 is aligned with (e.g., parallel to) the side (e.g., left and right) edges of a display 106 in a center of the controller body 702 on the front surface 704 of the controller body 702. As compared to circular trackpads, the quadrilateral-shaped trackpads 708 and 718 provide extra space at the corners that can be accessed by a finger (e.g., a thumb) of a user. Accordingly, the quadrilateral-shaped trackpads 708 and 718 may be more ergonomic than circular trackpads due to the extra area provided by the trackpads 708 and 718. For example, the quadrilateral shape of the trackpads 708 and 718 may give a user the ability to reorient his/her hands on the controller 100 and still access the trackpads 708 and 718 with his/her thumbs. Additionally, or alternatively, a user may choose to grip the controller body 702 in a slightly different way so that the corners of a trackpad (e.g., the trackpad 708 and 718) are used like the North, South, East, and West parts of the trackpad (e.g., like a diamond-shaped trackpad).

The controller 100 may further include a left handle 308 and a right handle 310 by which the user may hold the controller 100 via right and left hands of the user, respectively. As shown, the left handle 308 may be disposed on a left-hand side of the controller body 702 and the right handle 310 may be disposed on a right-hand side of the controller body 702. Holding the left handle 308 in the left hand may provide access to the left joystick 706, the left trackpad 708, and/or the left D-pad. Holding the right handle 310 in the right hand may provide access to the right joystick 716, the right trackpad 718, and/or the one or more right buttons 720.

The display 106 may be located within a center of the controller body 702. The display 106 may be disposed between the left handle 308 and the right handle 310, within the center of the controller body 702. As discussed in detail herein, the display 106 may present content associated with a game or other application being controlled or operated by the controller 100. For example, the display 106 may present gameplay environments of a game being operated or controlled by the controller 100. The display 106 may also present various UIs and/or menus including icons, or other elements, that are selectable by the user. The display 106 may be sensitive and responsive to touch input. In some instances, the display 106 may include a touch sensor configured to detect a presence and a location of the touch input for performing one or more actions. Moreover, when the controller 100 is held in the left hand and/or right hand of the user, all of or portions of the display 106 may be accessible (e.g., reachable) by the user.

Figure 8:
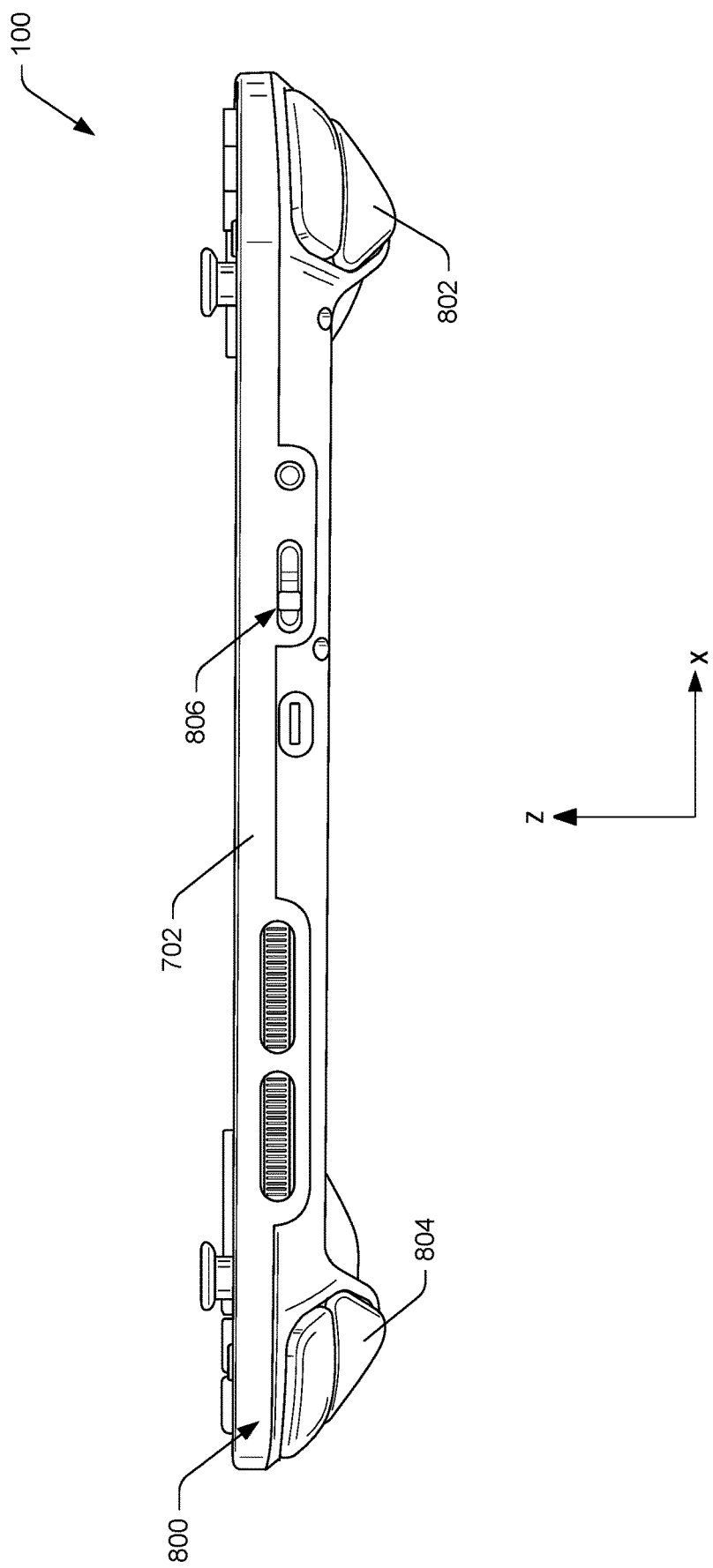
FIG. 8 illustrates a top view of the handheld controller of FIG. 1, illustrating, in part, one or more top-surface controls.

FIG. 8 illustrates a top view of the controller 100, showing a top 800 of the controller body 702. The top 800 may include one or more left trigger(s) 802 and/or one or more right triggers 804. In some instances, each of the one or more left trigger(s) 802 and/or the one or more right trigger(s) 804 may be located along the top 800 of the controller body 702. The one or more left trigger(s) 802 and/or one or more right trigger(s) 804 may be controlled by index fingers of the user during normal operation while the controller 100 is held by the user. The top 800 may additionally, or alternatively, include buttons 806 (or other additional input controls controllable by fingers of the user). In some instances, the top 800 may include a touch sensor for detecting the presence, position, and/or gesture of the finger(s) on the control(s). Additionally, the top 800 may include receiver(s), such as a wired communication interface (e.g., a port, plug, jack, etc.), for communicatively coupling the controller 100 to external devices (e.g., charger, game console, display, computing device, etc.).

Figure 9:
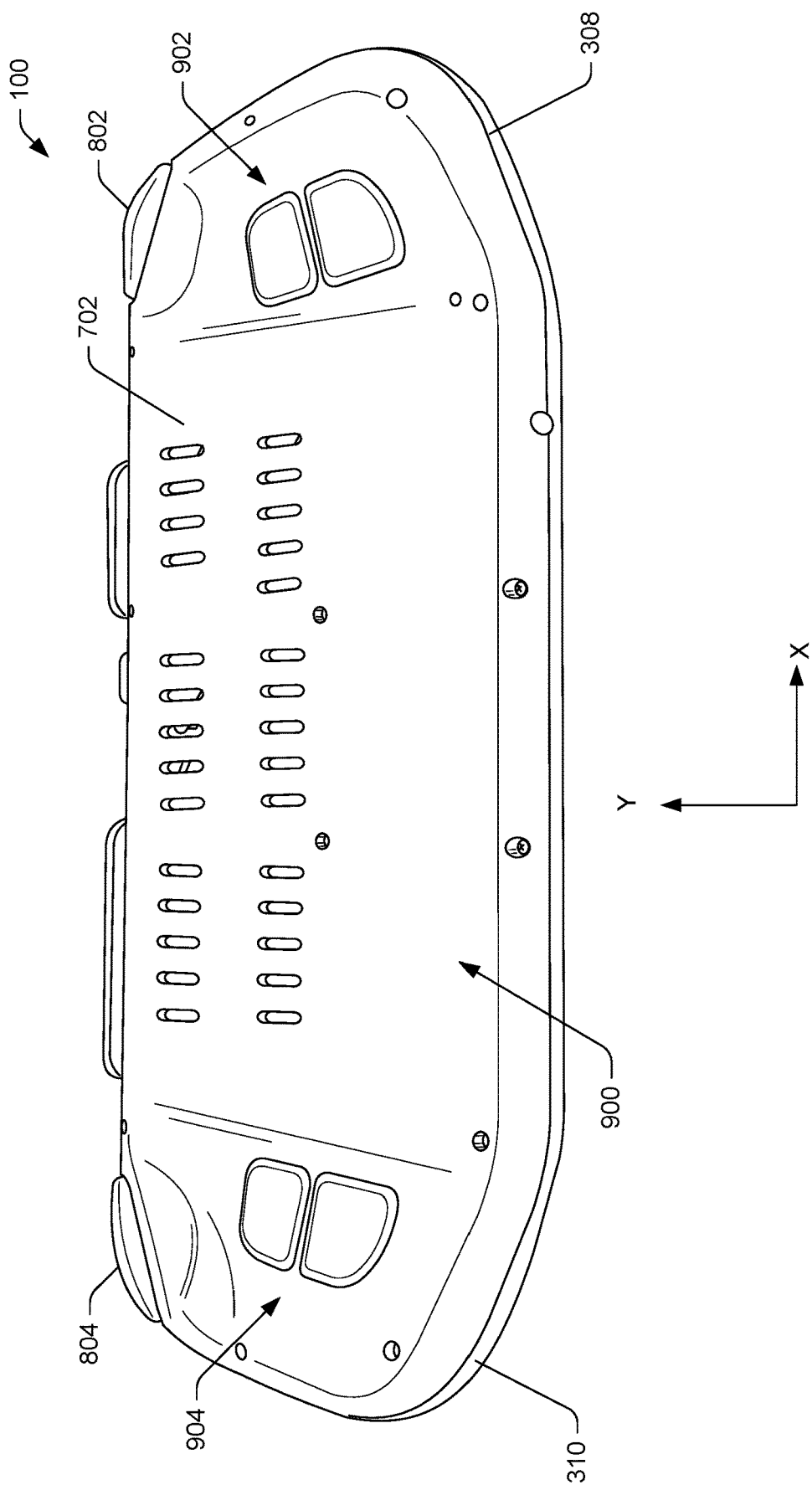
FIG. 9 illustrates a rear view of the handheld controller of FIG. 1, illustrating, in part, one or more rear-surface controls.

FIG. 9 illustrates a back view of the controller 100, showing a back 900 of the controller body 702. The one or more left trigger(s) 802 and the one or more right trigger(s) 804 are also visible in the back view of FIG. 9, as are the left handle 308 and a right handle 310. The back 900 of the controller body 702 may also one or more left control(s) 902 and/or one or more right control(s) 904, which may be conveniently manipulated by the index or middle fingers of the user during normal operation while the controller 100 is held in the hands of the user. The one or more left control(s) 902 and/or one or more right control(s) 904 may be touch-sensitive to identify the presence, position, and/or gestures of one or more fingers on the control(s).

Figure 10:
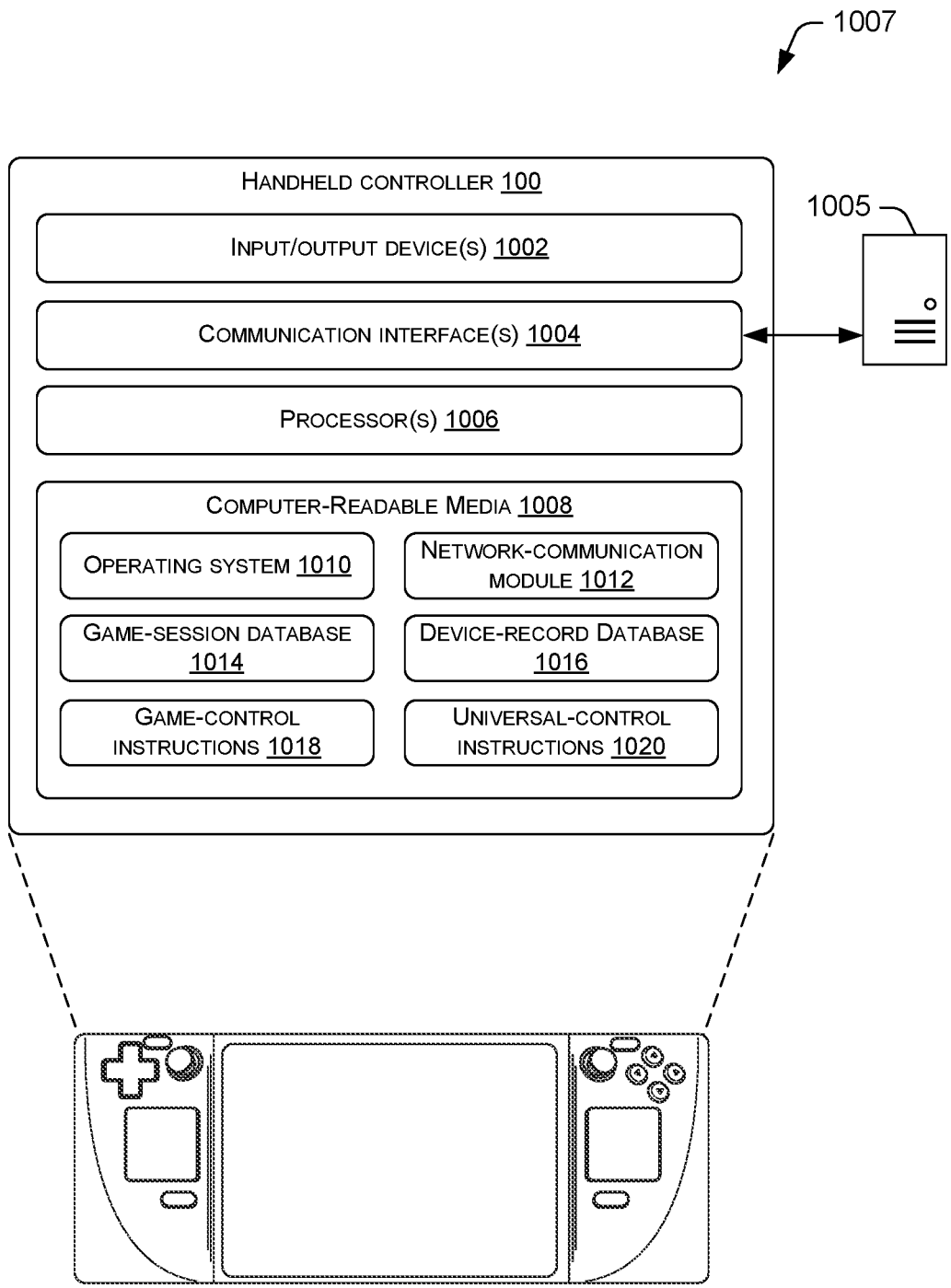
FIG. 10 illustrates example functional components of the handheld controller of FIG. 1.

FIG. 10 illustrates example computing components of the controller 100. As illustrated, the controller 100 includes one or more input/output (I/O) devices 1002, such as the controls described above (e.g., joysticks, trackpads, triggers, etc.), potentially any other type of input or output devices. For example, the I/O devices 1002 may include one or more microphones to receive audio input, such as user voice input. In some implementations, one or more cameras or other types of sensors (e.g., inertial measurement unit (IMU)) may function as input devices to receive gestural input, such as motion of the handheld controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on and/or functionalities of the controller (e.g., modes). While a few examples have been provided, the controller may additionally or alternatively comprise any other type of output device.

In some instances, output by the one or more output devices may be based on input received by one or more of the input devices. For example, selection of a control may result in the output of a haptic response by a vibrator located adjacent (e.g., underneath) the control or at any other location. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output. Additionally, certain controls or portions of the controls may be illuminated based on received inputs.

In addition, the controller 100 may include one or more communication interfaces 1004 to facilitate a wireless connection to a network and/or to one or more remote systems and/or devices 1005 (e.g., a host computing device executing an application, a game console, etc.). The communication interfaces 1004 may implement one or more of various wireless technologies, such as Wi-Fi, Bluetooth, radio frequency (RF), and so on. It is to be appreciated that the controller 100 may further include physical ports to facilitate a wired connection to a network, a connected peripheral device, or a plug-in network device that communicates with other wireless networks.

In the illustrated implementation, the controller 100 further includes one or more processors 1006 and computer-readable media 1008. In some implementations, the processors(s) 1006 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

Additionally, each of the processor(s) 1006 may possess its own local memory, which also may store program modules, program data, and/or one or more operating systems.

The computer-readable media 1008 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1008 may be implemented as computer-readable storage media ("CRSM"), which may be any available physical media accessible by the processor(s) 1006 to execute instructions stored on the computer-readable media 1008. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1006.

Several modules such as instruction, datastores, and so forth may be stored within the computer-readable media 1008 and configured to execute on the processor(s) 1006. A few example functional modules are shown as stored in the computer-readable media 1008 and executed on the processor(s) 1006, although the same functionality may alternatively be implemented in hardware, firmware, or as a system on a chip (SOC).

An operating system module 1010 may be configured to manage hardware within and coupled to the handheld controller 100 for the benefit of other modules. In addition, the computer-readable media 808 may store a network-communications module 1012 that enables the handheld controller 100 to communicate, via the communication interfaces 1004, with one or more other devices 1005, such as a personal computing device executing an application (e.g., a game application), a game console, a remote server, or the like. The computer-readable media 1008 may further include a game-session database 1014 to store data associated with a game (or other application) executing on the controller or on a computing device to which the controller couples. The computer-readable media 1008 may also include a device-record database 1016 that stores data associated with devices to which the controller couples, such as the personal computing device, game console, remote server or the like. The computer-readable media 1008 may further store game-control instructions 1018 that configure the controller to function as a gaming controller, and universal-control instructions 1020 that configure the handheld controller 100 to function as a controller of other, non-gaming devices.

In some instances, some or all of the components (software) shown in FIG. 10 could be implemented on another computing device(s) 1005 that is part of a controller system 1007 including the controller. In such instances, the processes and/or functions described herein may be implemented by other computing devices 1005 and/or the controller 100. By way of example, the controller 100 may couple to a host PC or console in the same environment, a computing device(s)/server and provide the computing device 1005 with data indicating presses, selections, and so forth received at the controller 100. The controller 100, for example, may transmit data indicating touch inputs received at the display 106 to the computing devices 1005, and the computing devices 1005 may determine where the touch input is received on the controller 100. The computing device 1005 may then cause associated actions to be performed. For example, the computing device 1005 may cause menu(s) to be surfaced or displayed on the display 106. Additionally, or alternatively, the computing devices may receive data indicating a selection of an icon within one of the menu(s). These icon(s), as noted above, may be associated with certain actions and the computing device(s) 1005 may carry out these actions. For example, in the event that the user selects an icon associated with engaging in a conversation with one or more friends, the computing device(s) may receive text data and/or audio data from the controller and provide the data to devices operated by the friends of the user. The computing device(s) 1005 may therefore help facilitate or carry out the functions or actions selected by the user. However, while a few scenarios are described, the controller 100 and the computing device(s) 1005 may communicatively couple with one another for transmitting and receiving data such that the controller 100, the computing device 1005, and/or other devices of the controller system 1007 may perform the operations and processes described herein.

Example Clauses

1. A controller system including: one or more processors; and a controller including a display, the display being touch sensitive and configured to provide, to the one or more processors, touch data indicative of touch input received at the display, and wherein the display is configured to display a menu along at least one of a top edge or a bottom edge of the display, wherein the menu includes one or more selectable icons associated with at least one of: adjusting a setting of the controller; capturing content presented on the display; or establishing a communication link with one or more devices.
2. The controller system of clause 1, wherein the menu is displayed based at least in part on receiving touch input at or along at least one of the top edge or the bottom edge of the display.
3. The controller system of clause 1, wherein the menu includes a first menu displayed along the top edge of the display, wherein the display is configured to display a second menu along the bottom edge of the display, and wherein at least one of: the first menu and the second menu are displayed based at least in part on receiving touch input at or along the top edge of the display; or the first menu and the second menu are displayed based at least in part on receiving touch input at or along the bottom edge of the display.
4. The controller system of clause 1, wherein: individual icons of the one or more selectable icons are associated with an action, and based at least in part on receiving a selection of the one or more selectable icons, the one or more processors are configured to cause the action to be performed.
5. The controller system of clause 1, wherein: the one or more selectable icons are horizontally spaced apart along at least one of the top edge or the bottom edge of the display.
6. The controller system of clause 1, wherein: after the menu is displayed, the menu is removed from being displayed on the display based at least in part on at least one of: receiving a selection of the one or more selectable icons; receiving a touch input on the display, outside an area of the menu; or receiving data indicating a selection or a movement of one or more controls of the controller.
7. A controller system including: one or more processors; and a controller including a display, the display being touch sensitive and configured to provide, to the one or more processors, touch data indicative of touch input received at the display, and wherein the display is configured to display a menu along at least one of a left edge or a right edge of the display, wherein the menu includes one or more selectable icons associated one or more controls of a game being operated at least in part by the controller.
8. The controller system of clause 7, wherein: the menu is displayed based at least in part on receiving touch input at or along at least one of the left edge or the right edge of the display.
9. The controller system of clause 7, wherein the menu includes a first menu displayed along the left edge of the display, wherein the display is configured to display a second menu along the right edge of the display, and wherein at least one of: the first menu and the second menu are displayed based at least in part on receiving touch input at or along the left edge of the display; or the first menu and the second menu are displayed based at least in part on receiving touch input at or along the right edge of the display.
10. The controller system of clause 7, wherein: individual icons of the one or more selectable icons are associated with an action, and based at least in part on receiving a selection of the one or more selectable icons, the one or more processors are configured to cause the action to be performed.
11. The controller system of clause 7, wherein: the one or more selectable icons are vertically spaced apart along at least one of the left edge or the right edge of the display.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A controller system comprising:
one or more processors;
a controller comprising controls and a display, the controls comprising at least one of a trackpad, a joystick, or a directional pad (D-pad), and the display being touch sensitive; and
non-transitory computer readable media storing instructions, that when executed by the one or more processors, cause the one or more processors to perform acts comprising:
  causing presentation of game content within a game content window on the display, the game content associated with a video game;
  receiving an indication that touch input was provided on the display during the presentation of the game content within the game content window; and
  in response to the receiving of the indication:
    causing the game content window to shift upwards from a current position on the display to a new position on the display as a repositioned game content window; and
    causing presentation of one or more selectable elements below the repositioned game content window on the display, wherein the one or more selectable elements are selectable to at least one of:
      adjust a setting of the controller by specifying which of the controls are enabled or by reconfiguring how the controls map to game input associated with the video game;
      capture a still image of the game content presented within the repositioned game content window on the display; or
      select a player who is playing the video game using a different controller to chat with during gameplay.

2. The controller system of claim 1, wherein the receiving of the indication comprises receiving an indication that a swipe gesture was provided on the display and that the swipe gesture was provided in an upward direction at a bottom edge of the display.

3. The controller system of claim 1, wherein the causing the presentation of the one or more selectable elements comprises causing presentation of a menu of multiple selectable elements along a bottom edge of the display.

4. The controller system of claim 1, wherein:
the acts further comprise, in response to the receiving of the indication, causing the game content window to scale to a smaller size game content window; and
the one or more selectable elements are presented below the repositioned game content window that is scaled to the smaller size game content window.

5. The controller system of claim 1, wherein a first aspect ratio of the game content is smaller than a second aspect ratio of the display.

6. The controller system of claim 1, wherein:
the display is positioned on a front surface of a controller body of the controller at a center of the front surface; and
the controls are disposed on the front surface of the controller body outside of the display.

7. The controller system of claim 1, wherein the acts further comprise:
causing presentation of a first menu of first selectable elements along a left edge of the display; and
causing presentation of a second menu of second selectable elements along a right edge of the display,
wherein the first selectable elements and the second selectable elements are selectable to control an aspect of the video game.

8. A method comprising:
causing presentation of game content within a game content window on a display of a controller, the display comprising a touch sensitive display, and the game content associated with a video game, wherein the controller further comprises controls comprising at least one of a trackpad, a joystick, or a directional pad (D-pad);
receiving, by a processor, an indication that touch input was provided on the display; and
in response to the receiving of the indication:
  causing the game content window to at least one of:
    scale to a smaller size game content window; or
    move from a current position on the display to a new position on the display as a repositioned game content window; and
  causing presentation, on the display, of one or more selectable elements outside of the smaller size game content window or the repositioned game content window, wherein the one or more selectable elements are selectable to at least one of:
    adjust a setting of the controller by specifying which of the controls are enabled or by reconfiguring how the controls map to game input associated with the video game;
    capture a still image of the game content presented on the display within the smaller size game content window or the repositioned game content window; or
    select a player who is playing the video game using a different controller to chat with during gameplay.

9. The method of claim 8, wherein, in response to the receiving of the indication:
the game content window is moved upwards or downwards from the current position to the new position; and
the one or more selectable elements are presented below or above the repositioned game content window on the display.

10. The method of claim 9, wherein:
the receiving of the indication comprises receiving an indication that a swipe gesture was provided on the display;
the method further comprises determining, by the processor, whether the swipe gesture was provided in an upward direction at a bottom edge of the display or in a downward direction at a top edge of the display; and
the game content window is moved upwards or downwards based at least in part on the determining.

11. The method of claim 8, wherein the causing the presentation of the one or more selectable elements comprises causing presentation of a menu of multiple selectable elements along an edge of the display.

12. The method of claim 8, further comprising:
receiving, by the processor, a second indication that second touch input was provided on the display at a location of a selectable element of the one or more selectable elements; and
at least one of:
adjusting the setting of the controller;
capturing the still image of the game content; or
selecting the player to chat with during the gameplay.

13. The method of claim 8, wherein a first aspect ratio of the game content is smaller than a second aspect ratio of the display.

14. A controller system comprising:
one or more processors;
a controller comprising controls and a display, the controls comprising at least one of a trackpad, a joystick, or a directional pad (D-pad), and the display being touch sensitive; and
non-transitory computer readable media storing instructions, that when executed by the one or more processors, cause the one or more processors to perform acts comprising:
causing presentation of game content within a game content window on the display, the game content associated with a video game;
receiving an indication that touch input was provided on the display; and
in response to the receiving of the indication:
causing the game content window to at least one of:
scale to a smaller size game content window; or
move from a current position on the display to a new position on the display as a repositioned game content window; and
causing presentation, on the display, of one or more selectable elements outside of the smaller size game content window or the repositioned game content window, wherein the one or more selectable elements are selectable to at least one of:
adjust a setting of the controller by specifying which of the controls are enabled or by reconfiguring how the controls map to game input associated with the video game;
capture a still image of the game content presented on the display within the smaller size game content window or the repositioned game content window; or
select a player who is playing the video game using a different controller to chat with during gameplay.

15. The controller system of claim 14, wherein, in response to the receiving of the indication:
the game content window is moved upwards or downwards from the current position to the new position; and
the one or more selectable elements are presented below or above the repositioned game content window on the display.

16. The controller system of claim 15, wherein:
the receiving of the indication comprises receiving an indication that a swipe gesture was provided on the display;
the acts further comprise determining whether the swipe gesture was provided in an upward direction at a bottom edge of the display or in a downward direction at a top edge of the display; and
the game content window is moved upwards or downwards based at least in part on the determining.

17. The controller system of claim 14, wherein the causing the presentation of the one or more selectable elements comprises causing presentation of a menu of multiple selectable elements along an edge of the display.

18. The controller system of claim 14, wherein a first aspect ratio of the game content is smaller than a second aspect ratio of the display.

19. The controller system of claim 14, wherein:
the display is positioned on a front surface of a controller body of the controller at a center of the front surface; and
the controls are disposed on the front surface of the controller body outside of the display.

20. The controller system of claim 14, wherein the acts further comprise:
causing presentation of a first menu of first selectable elements along a left edge of the display; and
causing presentation of a second menu of second selectable elements along a right edge of the display,
wherein the first selectable elements and the second selectable elements are selectable to control an aspect of the video game.

* * * * *